US010923135B2

(12) United States Patent
Winarski

(10) Patent No.: US 10,923,135 B2
(45) Date of Patent: Feb. 16, 2021

(54) MATCHED FILTER TO SELECTIVELY CHOOSE THE OPTIMAL AUDIO COMPRESSION FOR A METADATA FILE

(71) Applicant: Tyson York Winarski, Mountain View, CA (US)

(72) Inventor: Tyson York Winarski, Mountain View, CA (US)

(*) Notice: Subject to any disclaimer, the term of this patent is extended or adjusted under 35 U.S.C. 154(b) by 123 days.

(21) Appl. No.: 16/159,707

(22) Filed: Oct. 14, 2018

(65) Prior Publication Data
US 2020/0118578 A1   Apr. 16, 2020

(51) Int. Cl.
*G10L 19/02* (2013.01)
*G06F 17/14* (2006.01)
*G10L 19/26* (2013.01)
*G10L 19/24* (2013.01)

(52) U.S. Cl.
CPC ............ *G10L 19/02* (2013.01); *G06F 17/142* (2013.01); *G10L 19/24* (2013.01); *G10L 19/26* (2013.01)

(58) Field of Classification Search
CPC ..................................................... G10L 19/00
See application file for complete search history.

(56) References Cited

U.S. PATENT DOCUMENTS 7,295,608 B2 * 11/2007 Reynolds ................ H04L 29/06
375/240.01
8,675,733 B2 * 3/2014 Mabey .................... H04L 29/06
375/240.1
8,861,927 B2 * 10/2014 Sirivara ................ G10L 19/167
386/239
9,299,364 B1 * 3/2016 Pereira .................. G06F 16/683
2018/0350392 A1 * 12/2018 Zhao ....................... G10L 25/21

OTHER PUBLICATIONS

Jin, Akio, et al. "A hierarchical lossless/lossy coding system for high quality audio up to 192 kHz sampling 24 bit format." IEEE Transactions on Consumer Electronics 49.3 (2003): 759-764. (Year: 2003).*
Guido, Rodrigo Capobianco, et al. "A matched FIR filter bank for audio coding." Seventh IEEE International Symposium on Multimedia (ISM'05). IEEE, 2005. (Year: 2005).*
Vercellesi, Giancarlo, Andrea Vitali, and Martino Zerbini. "MP3 audio quality for single and multiple encoding." 2007 IEEE International Conference on Multimedia and Expo. IEEE, 2007. (Year: 2007).*
Gunawan, Teddy Surya, Siti Aisyah Abdul Rashid, and Mira Kartiwi. "Investigation of various algorithms on multichannel audio compression." 2017 IEEE 4th International Conference on Smart Instrumentation, Measurement and Application (ICSIMA). IEEE, 2017. (Year: 2017).*

* cited by examiner

*Primary Examiner* — Brian L Albertalli
(74) *Attorney, Agent, or Firm* — The Winarski Firm, PLLC

(57) ABSTRACT

This patent specification discloses a system for selecting an optimal audio codec algorithm to compress audio files that are wrapped within a Material eXchange Format (MXF) file. This patent specification melds the Material eXchange Format (MXF) for files together with matched-filter technology to provide a standards-compatible implementation for the selection and utilization of an optimal audio compression technology for a specific audio file included within an MXF file.

20 Claims, 16 Drawing Sheets

| Hexadecimal Value 410 | Representation in Audio Key 420 |
|---|---|
| 0h | No Compression |
| 1h | Dolby AC-3 format |
| 2h | Dolby AC-4 format |
| 3h | Dolby TrueHD format |
| 4h | Dolby E format |
| 5h | ALE (Apple Lossless Encoder) format |
| 6h | ALAC (Apple Lossless Audio Codec) format |
| 7h | AAC (Advanced Audio Encoding) format |
| 8h | DVD-A (DVD-Audio) format |
| 9h | AIFF (Audio Interchange File Format) |
| Ah | MP3 format |

MATCHED FILTER TO SELECTIVELY CHOOSE THE OPTIMAL AUDIO COMPRESSION FOR A METADATA FILE

BACKGROUND

The Material eXchange Format (MXF), is a container format for professional digital video and audio/sound media which is defined by a set of SMPTE standards. SMPTE, the Society of Motion Picture and Television Engineers, was founded in 1916 as the Society of Motion Picture Engineers.

MXF is a "container" or "wrapper" format which supports a number of different streams of coded "essence", encoded in any of a variety of video and audio/sound compression formats, together with a metadata wrapper which describes the material contained within the MXF file. MXF has full timecode and metadata support, and is intended as a platform-agnostic stable standard for future professional video and audio/sound applications. MXF was developed to carry a subset of the Advanced Authoring Format (AAF) data model, under a policy known as the Zero Divergence Directive (ZDD). This theoretically enables MXF/AAF workflows between Non-Linear Editing (NLE) systems using AAF and cameras, servers, and other devices using MXF. There are 2 basic types of MXF clip. The first are those where the essence (media) is actually stored in the same file as the metadata that refers to it. These files are said to have internal essence. The second type is that where the essence is stored in separate files to the metadata, and these files are said to have external essence. In this case, the decoder first reads the metadata file, and that metadata points to the files in which the individual pieces of essence are stored.

SONY®'s XDCAM MXF is supported by ADOBE® After Effects, ADOBE® Premiere Pro, APPLE® Final Cut Pro X, AUTODESK® Smoke, AVID®, Capella systems, DALET®, EVS, Imagine Communications Corp., OMNEON®, QUANTEL®, RHOZET®, SONY® Vegas Pro, SORENSON SQUEEZE®, TELESTREAM® FLIP-FACTORY®, Grass Valley EDIUS®, Grass Valley K2, and Merging Technologies VCube. PANASONIC®'s P2 MXF is supported by ADOBE® After Effects, ADOBE® Premiere Pro, APPLE® Final Cut Pro X, AUTODESK® Smoke, AVID®, DALET®, EVS, Grass Valley EDUIS®, and Grass Valley K2. IKEGAMI® offers camcorders capable of recording in MXF wrapper using AVID® DNxHD video encoding at 145 Mbit/second, as well as MPEG-2 video encoding at 50 Mbit/second 4:2:2 long-GOP and 100 Mbit/second I-frame. GOP stands for Group of Pictures, consisting of I (independently coded), P (predictively coded using one picture), and B (bipredictive coded using two pictures) frames. In 2010, CANON® released its new lineup of professional file-based camcorders. The recording format used in these camcorders incorporates MPEG-2 video with bitrates up to 50 Mbit/second and 16-bit linear PCM audio/sound in what CANON® has called XF codec. CANON® claims that its flavor of MXF is fully supported by major NLE systems including ADOBE® Premiere, APPLE® Final Cut Pro X, AVID® Media Composer, and Grass Valley EDUIS®. MXF is used as the audio and video packaging format for Digital Cinema Package (DCP). It is also used regarding STANAG (NATO STANdardized AGreement) specification documents. The file extension for MXF files is ".mxf". The MACINTOSH® file type code registered with APPLE® for MXF files is "mxf", including a trailing space. The Internet would have "application/mxf". CinemaDNG (intended by ADOBE® and others to be an open file format for digital cinema files) exploits MXF as one of its options for holding a sequence of raw video images. The Material eXchange Format is unique in that it provides a standard format for metadata on files for the transfer of those files between systems that is independent of the compression format used for the audio/video file contained within the MXF wrapper.

SUMMARY

This patent specification discloses a system for selecting an optimal audio codec algorithm to compress audio files that are wrapped within a Material eXchange Format (MXF) file. This patent specification melds the Material eXchange Format (MXF) for files together with matched-filter technology to provide a standards-compatible implementation for the selection and utilization of an optimal audio compression technology for a specific audio file included within an MXF file. As the Material eXchange Format is independent of the compression format used for the audio/video file contained within the MXF wrapper, it is possible to select an optimal audio compression technology for a specific file and compress that audio file with that compression technology and provide that audio file with an MXF wrapper. This technological innovation has application in Digital Video Broadcasting, Digital Video Streaming, Motion Picture Mastering, and long-term audio storage.

Providing the highest quality audio files for consumer enjoyment is the driving force behind this patent disclosure. Vinyl records are regarded as providing the highest quality in sound reproduction for consumers. However, for applications requiring digital storage and transmission of media files that include audio, it is necessary to use digital audio together with an audio codec. Not all audio compression technologies provide equal quality in audio for the end consumer. With any compression, some audio quality loss is inevitable. Very high frequencies are typically the first data to be eliminated, and while in theory these sounds are inaudible, their loss can rob your music of its subtle overtones, presence, dynamic range and depth of field.

The audio resolution and sonic quality of an MP3 is determined by the bit-rate at which it is encoded. The higher the bit-rate, the more data per second of music. A higher bit-rate creates better quality audio, along with a larger file. WMA (Windows Media Audio) was created by MICROSOFT®, and is often offered as an alternative to MP3 on music and video download sites. Some audio experts contend that the sonic quality of WMA is superior to MP3, but WMA files tend to sound overly bright and brittle, with less-than-optimal stereo imaging. AAC (Advanced Audio Coding) was designed to be a successor to MP3 and represents a sonic improvement over previous codec algorithms. AAC is a default standard for ITUNES®, the IPOD®, the IPHONE®, as well as PLAYSTATION® and NINTENDO DS®. AAC is also often used as the audio component for APPLE®'s QUICKTIME® and MP4 video formats. AC3 is a format developed by DOLBY® and is often used for video soundtracks due to its superior stereo imaging and ability to handle multitrack formats like 5.1 surround. Because of this, many consumer-grade DVD players support AC3 format. RA (REAL AUDIO®) is a fairly good-sounding codec, but is on the decline due to the fact that the files only play on REAL AUDIO®'s proprietary player. Ogg Vorbis is an open standard audio format that delivers a very high-quality sound. FLAC (Free Lossless Audio Codec) is one of the few audio formats that delivers truly lossless compression. FLAC is similar to a ZIP file, but is designed specifically for audio. FLAC is also open-source, and FLAC files can be played back on most MP3-compatible players. (There are several other lossless formats, including APPLE® Lossless, WMA 9 Lossless, Monkey's Audio and MPEG-4ALS, but none offer the open compatibility of FLAC.)

Optimization of audio quality compression is a balancing act between signal quality and data file size. Generally, larger files provide more data quality. Compressing larger files into smaller ones will save memory at the likely expense of sound quality. However, the range of sound within a particular audio file may allow for the use of a less sophisticated and less data intensive codec. For example, a lecture by a law professor discussing patent licensing will have less audio range than a rock concert by Queen staring Adam Lambert. Thus, it may be possible to compress different audio files with different audio codecs and maintain equal audio quality for the consumer.

The present system utilizes a matched filter to determine the audio quality of a particular audio file after compression. Matched filters are often used in signal detection to correlate a known signal, or template, with an unknown signal to detect the presence of the template in the unknown signal. In the frequency domain, a matched filter is the complex conjugate of the Fast Fourier Transform of a first signal pointwise divided by the pointwise product of the Fast Fourier Transform of this signal and the complex conjugate of the Fast Fourier Transform of this signal. Later, when a second signal needs to be compared to the first signal, the Fast Fourier Transform of the second signal is pointwise multiplied by the Matched Filter of the first signal, in the frequency domain, to produce a power spectrum of the two signals. A user-selectable threshold may be used to weed-out unsuitable power spectrums. The Fast Fourier Transform is a digital form of the Fourier Transform, where the results of repetitive calculations are stored in memory rather than recalculated each time they are needed. Matched filters have been used in the recent detection of gravity waves.

In a preferred embodiment, the present system is directed toward use of matched-filter technology to selectively pick the optimal audio codec technology for an audio clip "j" meant for encapsulation within an MXF wrapper using DOLBY® AC-3 format, DOLBY® AC-4 format, DOLBY® TrueHD, DOLBY® E, ALE (APPLE® Lossless Encoder), ALAC (APPLE® Lossless Audio Codec), AAC (Advanced Audio Encoding), DVD-A (DVD-Audio), AIFF (Audio Interchange File Format), WMA, RA, Ogg Vorbis, FLAC, or MP3. The system can determine the quality of audio for a given file compressed with different codecs based on the mean "P" of each of the individual power spectrums calculated by the pointwise product of the Fast Fourier Transform of the decoded (decompressed) audio and the matched filter created solely from the original audio. The system then ranks the different audio codec technologies based on the relative quality level of the audio based on the application of the matched filter.

The optimal codec technology is chosen based on the quality of the audio after decompression using the matched filter and the comparable file size. For example, a simpler less data intensive audio codec like MP3 may produce equal sound quality when compared to a more data intensive sophisticated audio codec like AC3 when the audio file has a very narrow range of audio signals, such as a monotoned law professor teaching patent licensing. In contrast, a Star Wars movie may have a vastly larger audio range of deep bass sounds for the Death Star flying through space and ultra-high frequency sounds for blaster noises. In this case, the MP3 and AC3 file formats may have vastly different sound quality based on the matched filter along with very different file sizes. The present system will compare the file sizes of these different compressed audio files to rank the file sizes based on the different compression technologies. The present system will then select an optimal codec technology based on a balance of highest desired quality within a specified quality range and a minimal desired file size within a desired size range. These quality ranges and size ranges are specified by a network administrator of the system. A network administrator may vary these quality and size ranges based upon bandwidth parameters of a given network to deliver desired media performance to end customers. Certain networks may have fewer bandwidth constraints than other networks and can therefore be less sensitive to file size and more sensitive to audio quality level. Other networks may have serious bandwidth constraints and be more flexible on audio quality and more sensitive to file size. For example, if two different codecs produce the same audio quality, the system will pick the codec that produces that smallest file size for bandwidth transmission efficiency. If one codec produces five percent higher audio quality at the cost of triple the file size, the system may pick the other codec with five percent lower quality that has one third the file size. The present system uses network administrator programable parameters to determine what is the optimal balance between audio quality and compression size to select a desired audio codec for a specific audio file.

In another embodiment, the system may not compress the audio clip "j" if the best power spectrum mean "P," between the original audio clip and the decoded (decompressed) audio clip, as identified by the matched filter, fails to exceed a threshold. In a further embodiment, the system is directed toward use of a byte within an MXF audio key, to identify whether the audio item within the MXF wrapper is uncompressed, or had been coded (compressed) via DOLBY® AC-3 format, DOLBY® AC-4 format, DOLBY® TrueHD, DOLBY® E, ALE (APPLE® Lossless Encoder), ALAC (APPLE® Lossless Audio Codec), AAC (Advanced Audio Encoding), DVD-A (DVD-Audio), AIFF (Audio Interchange File Format), and MP3. Further aspects of the system will become apparent as the following description proceeds and the features of novelty, which characterize this system, are pointed out with particularity in the claims annexed to and forming a part of this specification.

The present specification discloses a process for selecting an optimal audio codec for compressing an audio file for wrapping within a Material eXchange Format (MXF) file. The process includes selecting an original audio clip and creating a plurality of processed audio clips by compressing and then decompressing the original audio clip with a plurality of different audio codec algorithms. The process then takes a Fast Fourier Transform (FFT) of each of the processed audio clips and creates a matched filter utilizing the original audio clip to determine a power spectrum of each of the processed audio clips based on the taken FFT of each of the processed audio clips. Next, the process identifies a selected audio codec algorithm used to create a processed audio clip having a highest power spectrum utilizing the matched filter, thereby signifying the highest audio quality. Finally, the process compresses the original audio clip with the selected audio codec algorithm and wraps it within a Material eXchange Format (MXF) file. The process may also create a hexadecimal identifier signifying which audio codec algorithm was used for the selected audio codec algorithm. This hexadecimal identifier is stored within an audio key in an essence container of the Material eXchange Format (MXF) file. The plurality of different audio codec algorithms includes DOLBY® AC-3 format, DOLBY® AC-4 format, DOLBY® TrueHD, DOLBY® E, ALE (APPLE® Lossless Encoder), ALAC (APPLE® Lossless Audio Codec), AAC (Advanced Audio Encoding), DVD-A (DVD-Audio), AIFF (Audio Interchange File Format), MP3, WMA, RA, Ogg Vorbis, and FLAC. The power spectrum of each of the processed audio clips is formed by multiply the FFT of a particular audio clip with the matched filter. This process may use a memory storage device for storing the original audio clip and an MXF audio quality system. The MXF audio quality system includes a Fast Fourier Transform IP core that accesses the original audio file from the memory storage device and generates the processed audio clips. The MXF audio quality system also includes an audio quality ASIC/FPGA that uses a matched filter to generate the power spectrums of each of the processed audio clips and an MXF file wrapper module that wraps the original audio file after it is compressed in an MXF file. The original audio clip may not be compressed with any audio codec algorithm when the selected audio codec algorithm with the highest power spectrum fails to meet a minimum power spectrum threshold.

The present specification discloses a process for selecting an optimal audio codec for compressing an audio file for wrapping in a Material eXchange Format (MXF) file. The process includes selecting an original audio clip and creating a plurality of processed audio clips by compressing and then decompressing the original audio clip with a plurality of different audio codec algorithms. The process then determines a quality level of the different audio codec algorithms by taking a power spectrum of each processed audio clip using a matched filter formed from the original audio clip and a Fast Fourier Transform of each processed audio clip. Next, the process determines a file size for each processed audio clip when it is compressed by its respective audio codec algorithm. Then the process selects an optimal audio codec algorithm for the original audio clip based on the determined quality level and the file size and compresses the original audio clip with the optimal audio codec algorithm and wrapping it within a Material eXchange Format (MXF) file. An optimal audio codec algorithm may be determined in part by identifying a first audio codec algorithm used to create a processed audio clip having a highest power spectrum utilizing the matched filter, thereby signifying the highest audio quality. The optimal audio codec algorithm may also be further determined by identifying one or more other audio codec algorithms used to create processed audio clips having a power spectrum within a designated percentage range of the highest power spectrum level, and selecting the audio codec algorithm that has the smallest file size. The plurality of different audio codec algorithms is selected from a group including DOLBY® AC-3 format, DOLBY® AC-4 format, DOLBY® TrueHD, DOLBY® E, ALE (APPLE® Lossless Encoder), ALAC (APPLE® Lossless Audio Codec), AAC (Advanced Audio Encoding), DVD-A (DVD-Audio), AIFF (Audio Interchange File Format), MP3, WMA, RA, Ogg Vorbis, and FLAC. The power spectrum of each of the processed audio clips is formed by multiplying the FFT of a particular audio clip with the matched filter. The designated percentage range may be less than 15 percent. The designated percentage range may also be an integer designated through a graphical user interface. The MXF file may include a metadata identifier signifying which audio codec algorithm was used to compress the original audio file. This process may use a memory storage device for storing the original audio clip and an MXF audio quality system. The MXF audio quality system includes a Fast Fourier Transform IP core that accesses the original audio file from the memory storage device and generates the processed audio clips. The MXF audio quality system also includes an audio quality ASIC/FPGA that uses a matched filter to generate the power spectrums of each of the processed audio clips and an MXF file wrapper module that wraps the original audio file after it is compressed in an MXF file. The original audio clip may not be compressed with any audio codec algorithm when the selected audio codec algorithm with the highest power spectrum fails to meet a minimum power spectrum threshold. The MXF audio quality system also includes the graphical user interface accessible by a remote computer workstation through a distributed network.

The present specification discloses a Material eXchange Format (MXF) file generation system. This system includes a database storage device storing a plurality of original audio clips. This system also includes an audio quality processor formed of an ASIC or FPGA that accesses an original audio clip from the database and generates a power spectrum of the original audio clip by compressing and decompressing the original audio clip using a plurality of audio codec algorithms using a Fast Fourier Transform IP Core and a matched filter created from the original audio clip. This system further includes a graphical user interface that allows for the specification of a threshold for the power spectrum and a threshold for a size for an audio clip compressed by an audio codec algorithm. The system has an audio codec algorithm selector that choses an optimal audio codec algorithm based on a comparison of the generated power spectrum to the threshold acquired through the graphical user interface and the size of the compressed audio clip based on the threshold acquired through the graphical user interface. The system then also has a Material eXchange Format (MXF) file wrapping module that wraps the original audio clip within an MXF file after it has been compressed by the optimal audio codec algorithm. The plurality of audio codec algorithms may include DOLBY® AC-3 format, DOLBY® AC-4 format, DOLBY® TrueHD, DOLBY® E, ALE (APPLE® Lossless Encoder), ALAC (APPLE® Lossless Audio Codec), AAC (Advanced Audio Encoding), DVD-A (DVD-Audio), AIFF (Audio Interchange File Format), MP3, WMA, RA, Ogg Vorbis, and FLAC. The audio codec algorithm selector also choses an optimal audio codec algorithm based on selecting the audio codec algorithm that creates the smallest file size above the threshold for the power spectrum specified through the graphical user interface. The MXF file includes a metadata identifier signifying which audio codec algorithm was used to compress the original audio file.

BRIEF DESCRIPTION OF THE DRAWINGS

The novel features that are considered characteristic of the invention are set forth with particularity in the appended claims. The invention itself; however, both as to its structure and operation together with the additional objects and advantages thereof are best understood through the following description of the preferred embodiment of the present invention when read in conjunction with the accompanying drawings, wherein:

DETAILED DESCRIPTION

While the invention has been shown and described with reference to a particular embodiment thereof, it will be understood to those skilled in the art, that various changes in form and details may be made therein without departing from the spirit and scope of the invention.

Figure 1:
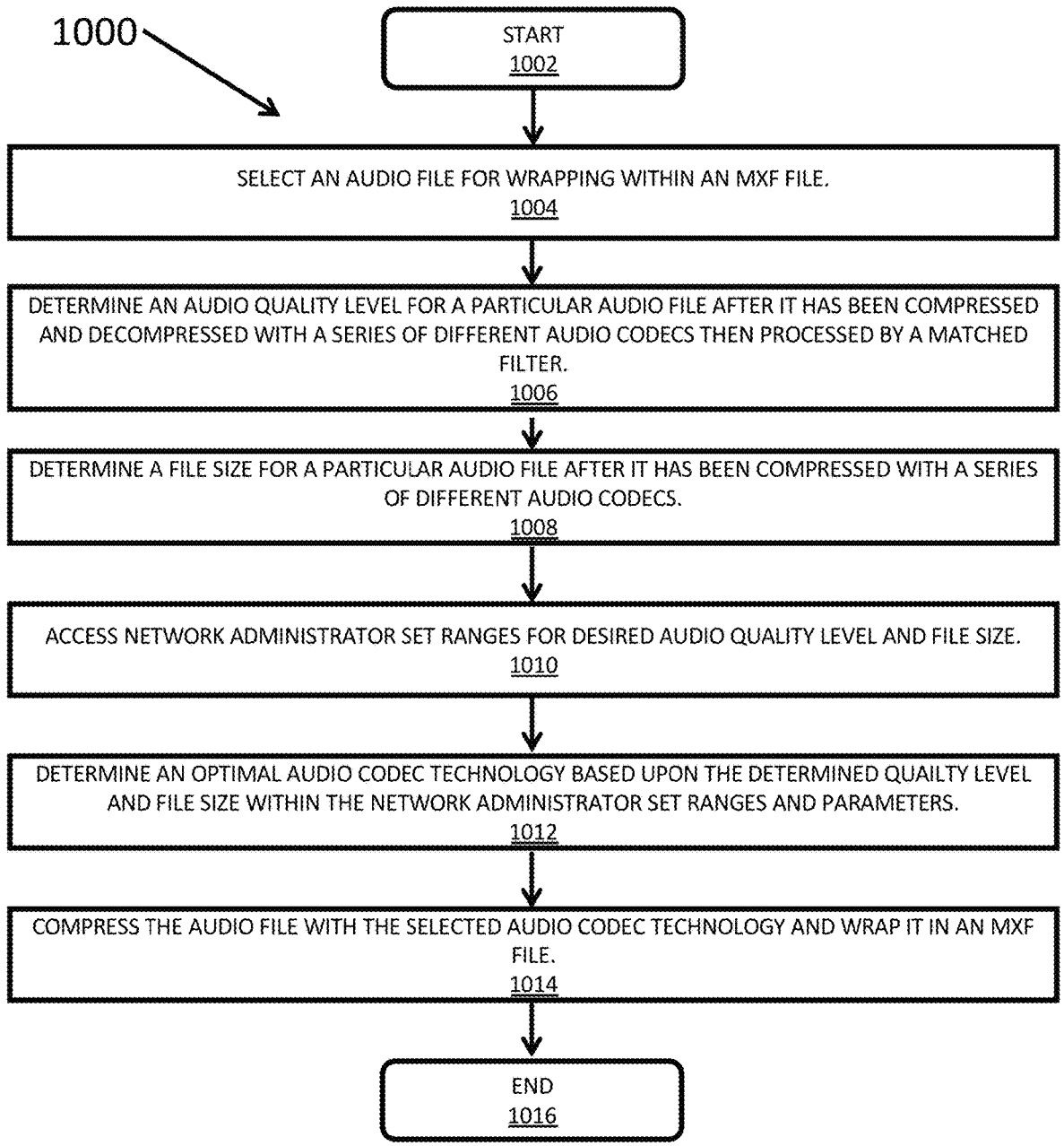
FIG. 1 illustrates a flowchart depicting a process for the selection and utilization of an optimal audio compression technology for a specific audio file included within an MXF file.
Figure 2:
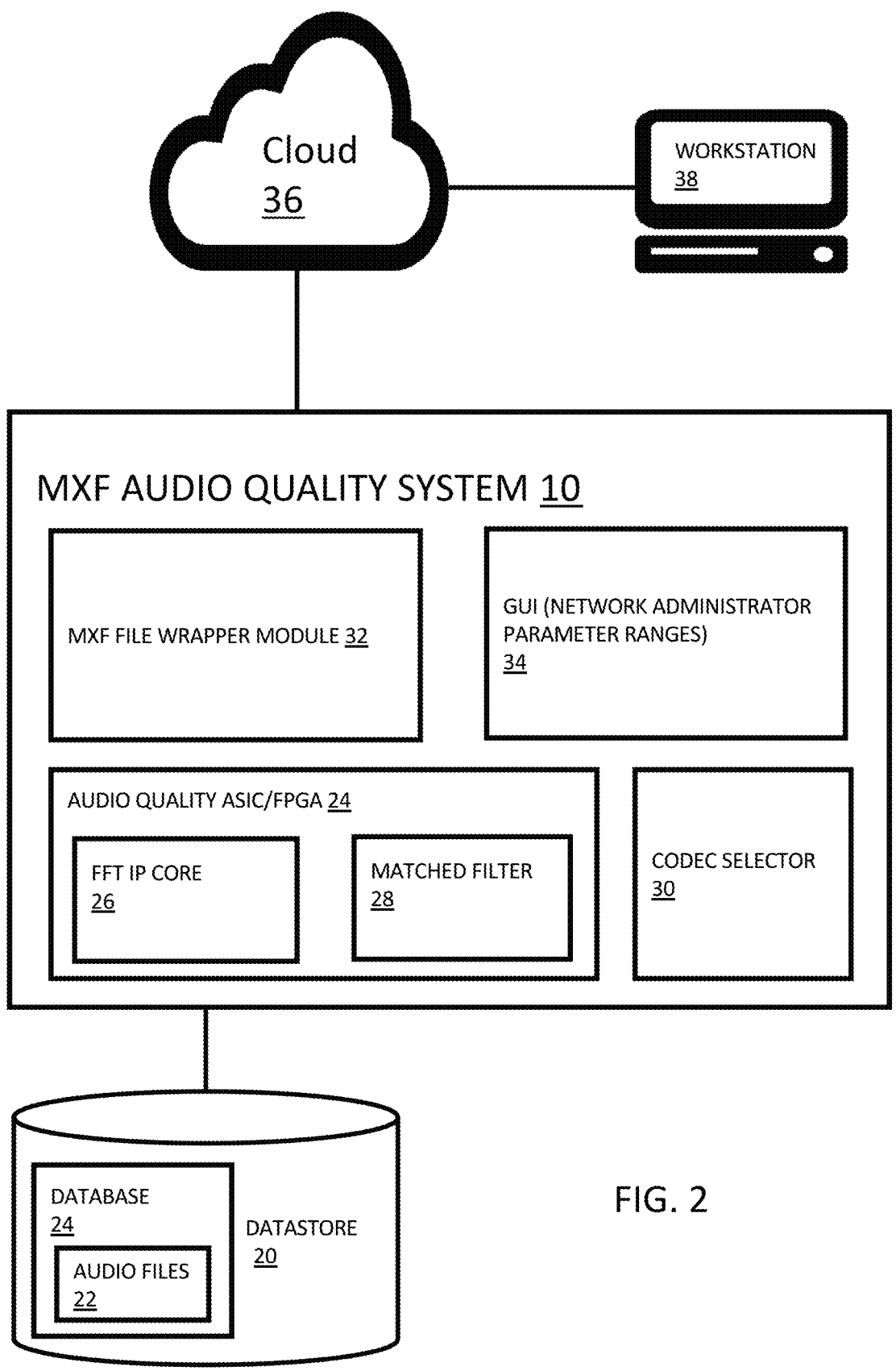
FIG. 2 illustrates a block diagram of an MXF audio quality system coupled to a data store, the Cloud, and a remote workstation.
Figure 10:
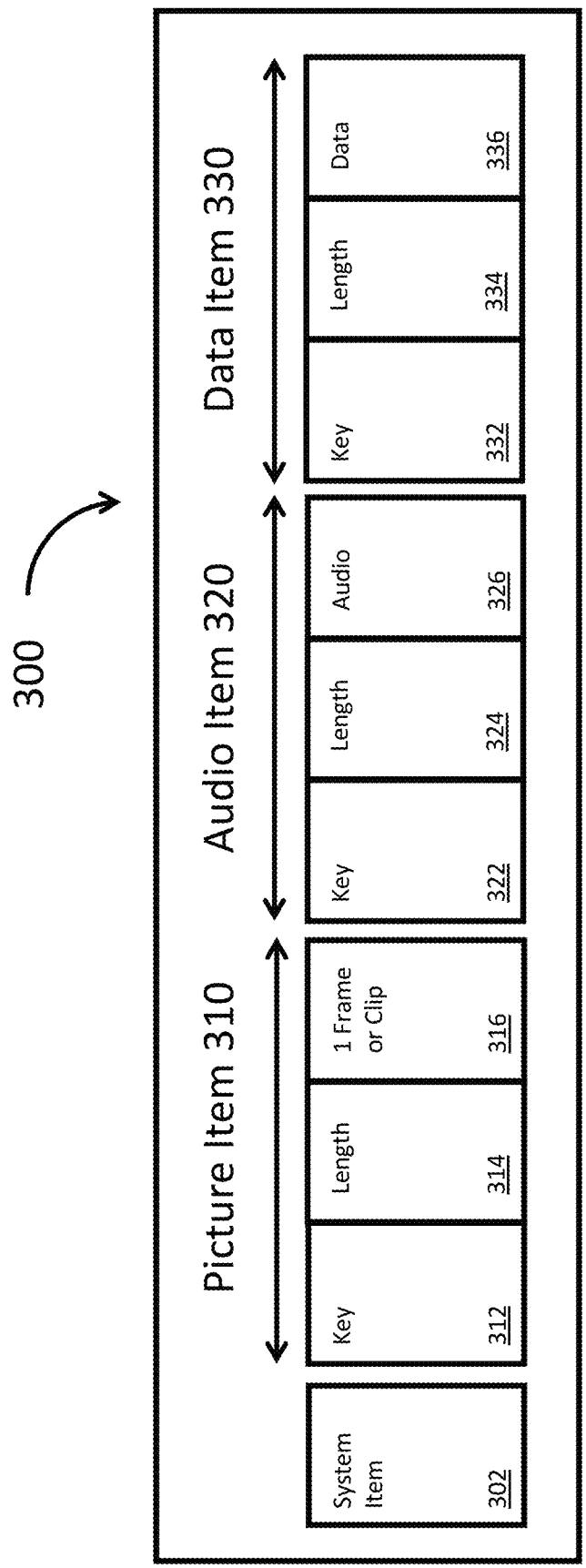
FIG. 10 illustrates a diagram of an MXF wrapped picture, audio, and data.

FIG. 1 illustrates a flowchart 1000 depicting a process for the selection and utilization of an optimal audio compression technology for a specific audio file included within an MXF file. This process selects an optimal audio codec algorithm to compress audio files that are wrapped within a Material eXchange Format (MXF) file. This process melds the Material eXchange Format (MXF) for files together with matched-filter technology to provide a standards-compatible implementation for the selection and utilization of an optimal audio compression technology for a specific audio file included within an MXF file. As the Material eXchange Format is independent of the compression format used for the audio/video file contained within the MXF wrapper, it is possible to select an optimal audio compression technology for a specific file and compress that audio file with that compression technology and provide that audio file with an MXF wrapper. FIG. 2 illustrates a block diagram of an MXF audio quality system 10 coupled to a data store 20, the Cloud 36, and a remote workstation 38. The system 10 illustrated in FIG. 2 implements the process 1000 discussed in FIG. 1. The process begins with START 1002. In step 1004, the system selects an audio file from the database 24 for wrapping within an MXF file, which is illustrated in FIG. 10. In step 1006, the system 10 determines an audio quality level for a particular audio file after it has been compressed and decompressed for a series of different audio codecs then processed by a matched filter in order to generate a power spectrum for each audio codec. In step 1008, the system determines a file size for a particular audio file after it has been compressed with a series of different audio codecs. Then in step 1010, the system accessed a set of ranges, parameters, and thresholds specified through a graphical user interface by a network administrator for a desired quality level, quality range, and file size. These parameters reflect the need for producing a desired quality level for transferring audio across a network along with a desired performance level for transfer speed of the MXF file across the network considering the size of the MXF file, which is in part determined by the size of the compressed audio file, along with the hardware/software performance parameters of the network. In step 1012, the system 10 determines an optimal audio codec technology based on the determined quality level and file size within the network administrator set ranges and parameters. So, for example, the network administrator may decide to select the audio codec with the highest quality without regard to file size. The network administrator may also select a range of quality based on the audio codec with the highest quality and chose the audio codec that produces the smallest file size within that range. For example, that quality range may be to have a power spectrum within 15% of the highest quality power spectrum, within which the system 10 will select the audio codec that produces the smallest file size. While certain audio codecs produce higher quality than others through the use of more data, for a given audio file, simpler less data intensive audio codecs may produce a similar audio quality level through the use of much less data. For example, a monotoned patent licensing professor may be recorded with equal sound quality on an MP3 codec as well as DOLBY® AC-3 format. However, the MP3 codec may likely have a far smaller file size, making MP3 the optimal codec based on audio quality and file size. However, for a movie that has deep low bass sounds and high-pitched special effects far outside of the vocal range of a person, let alone a monotoned law professor, the DOLBY® AC-3 format will have a far higher quality than MP3, which would clip the more extreme audio ranges, thereby making DOLBY® AC-3 the optimal codec based on specified quality ranges. If the MP3 codec is within a designated quality range of DOLBY® AC-3 such as being within 15%, 10%, 5%, or some other designated integer percentage, the MP3 would be selected if it has the smaller file size. Next in step 1014, system 10 compresses the audio file with the selected audio codec technology that has been selected as the optimal one and then wraps the compressed audio file within the MXF file. System 10 will also designate within the MXF file which audio codec technology was used to compress the audio file that is wrapped within it. The process ENDS in step 1016.

FIG. 2 illustrates a block diagram of an MXF audio quality system 10 coupled to a data store 20, the Cloud 36, and a remote workstation 38. Data store 20 is a remote storage device that may be a magnetic storage device, such as a hard disk drive HDD, a solid-state storage device (SSD), an optical storage device, or other form of storage device. Data store 20 includes a database 24 and a set of audio files 22. Audio files 22 may be audio clips of movies, music, patent licensing lectures, nature sounds, or any form of audio. MXF audio quality system 10 accesses database 24 to access audio files 22 to incorporate them within an MXF file using MXF file wrapper module 32. The Material eXchange Format is unique in that it provides a standard format for metadata on files for the transfer of those files between systems that is independent of the compression format used for the audio/video file contained within the MXF wrapper. Thus, system 10 is configured to select an optimal audio codec to be used to compress the audio file prior to it becoming wrapped with the MXF file by MXF file wrapper module 32. The parameters and threshold for selecting what constitutes an optimal audio codec is designated by a network administrator through a graphical user interface 34. A network administrator would access GUI 34 from a remote workstation 38 through cloud 36. These parameters include whether to select the audio codec with the highest quality audio spectrum without regard for file size, thereby using audio quality as the sole selection parameter. The network administrator can designate that system 10 use audio quality and file size as a dual parameter selection process for selecting an optimal audio codec. For example, the network administrator may specify a percentage quality range based off of the highest power spectrum quality level that would be acceptable, such as within 15%, 10%, 5%, or some specified integer percentage. The administrator can then designate that system 10 select the audio codec that produces the smallest file size within that designated percentage range. Audio quality ASIC/FPGA 24 determines the audio quality level produced by a plurality of different audio codec algorithms for a specific audio file 22 accessed from data store 20. These audio codec algorithms include, but are not limited to, DOLBY® AC-3 format, DOLBY® AC-4 format, DOLBY® TrueHD, DOLBY® E, ALE (APPLE® Lossless Encoder), ALAC (APPLE® Lossless Audio Codec), AAC (Advanced Audio Encoding), DVD-A (DVD-Audio), AIFF (Audio Interchange File Format), MP3, WMA, RA, Ogg Vorbis, and FLAC. ASIC stands for an application-specific integrated circuit. FPGA stands for a field-programmable gate array. Audio quality ASIC/FPGA 24 takes the audio file 22 and compresses and decompresses it with each of the stored audio codec algorithms, thereby producing a set of different processed audio files that have been manipulated by a different audio codec. Audio quality ASIC/FPGA 24 then produces a matched filter 28 in order to determine a power spectrum of each of the processed audio files to determine which processed audio file has the best audio quality. Audio quality ASIC/FPGA 24 determines the power spectrum with matched filter 28 by taking a Fast Fourier Transform (FFT) with an FFT IP core 26. Once audio quality ASIC/FPGA 24 generates the power spectrum for each of the different processed audio files based on the different audio codecs, codec selector 30 applies the preferences, thresholds, and ranges specified by the network administrator to determine which audio codec satisfies the specified preferences, thresholds, and ranges as the optimal audio codec. Once the optimal audio codec is determined by the codec selector 30, MXF file wrapper module 32 compresses audio file 22 with the optimal audio codec and wraps it within an MXF file for transmission to another network node through cloud 36.

Figure 3:
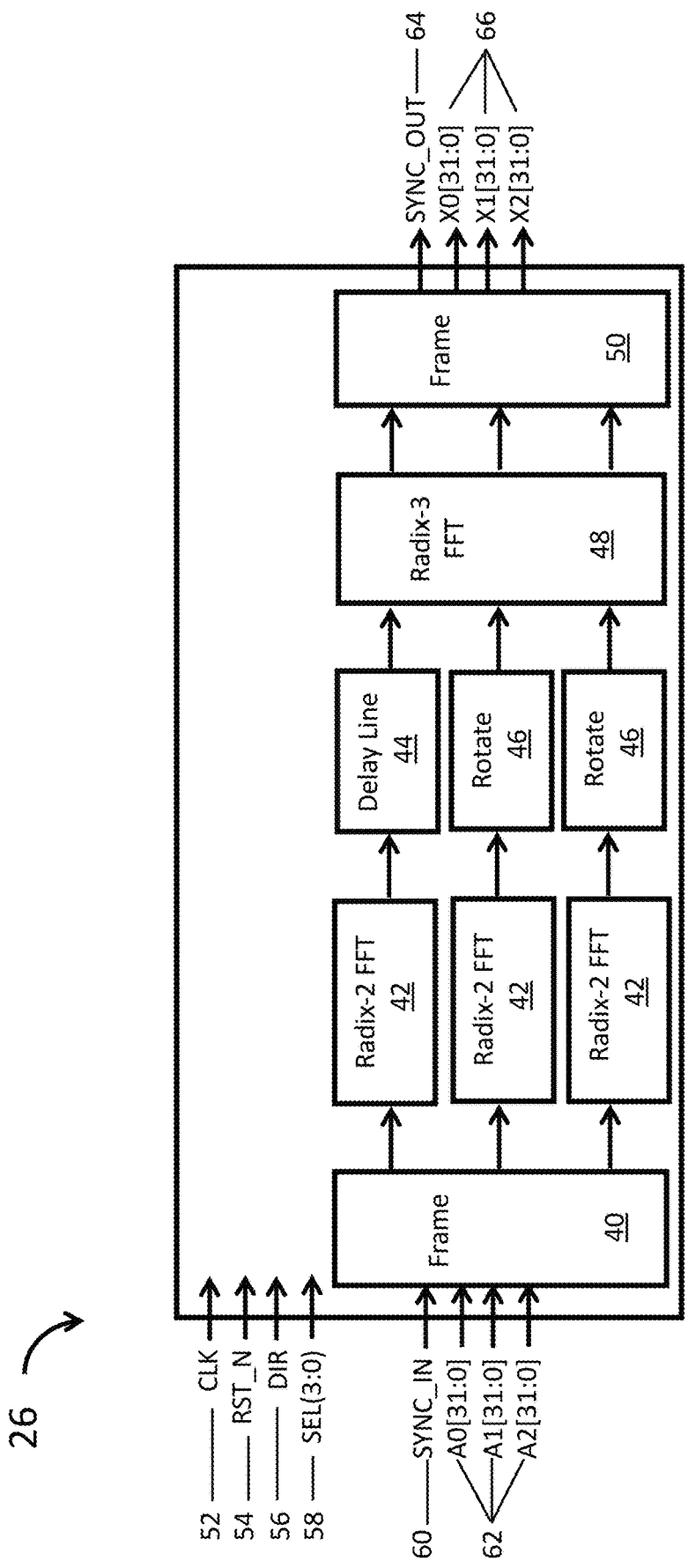
FIG. 3 illustrates a prior art diagram of a 3-Stream 768-Point Fast Fourier Transform (FFT) IP Core used within the MXF audio quality system.

FIG. 3 illustrates prior art 3-Stream, 768-Point, Fast Fourier Transform (FFT) IP Core 26, as shown in FIG. 2. This particular core, which is Dillon Engineering's Mixed-Radix FFT IP Core, is only one example of Dillon Engineering's many FFT cores. Frame blocks 40 and 50 use control signaling 84 (FIG. 4) to delimit discrete data frames per the selected transform length. In the case of the 768-point example, each radix2 FFT engine 42 supports up to a 256-length, using a Decimation-in-Frequency (DIF) form to take in natural-ordered inputs split among the 3 streams. In order to provide natural-order outputs on the proper streams, 2 of the streams contain an additional rotation stage 46 by way of a custom CORDIC (COordinate Rotation DIgital Computer) engine and twiddle multiply. A delay line 44 on the top stream is used to align data into the radix3 engine 48. The rotation stage can be eliminated in prime factor FFTs, resulting in different output ordering. Additional reordering and rotation stages may be required in other mixed-radix combinations. In the case of the 768-point example, FIG. 3, each radix3 engine 48 supports a 3-point FFT, using a Decimation-in-Time (DIT) form to provide natural-ordered outputs split among the 3 streams. The vector-radix FFT algorithm, is a multidimensional Fast Fourier Transform (FFT) algorithm, which is a generalization of the ordinary Cooley-Tukey FFT algorithm that divides the transform dimensions by arbitrary radices.

Figure 4:
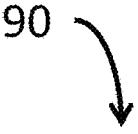
FIG. 4 gives a prior art table describing the signal inputs and outputs to the 3-Stream 768-Point Fast Fourier Transform (FFT) IP Core illustrated in FIG. 3.

Prior art Table 90 in FIG. 4 further describes elements in FFT IP CORE 26, where column 84 denotes the specific control signal, column 86 denotes the direction of the control signal, either input or output, and column 88 gives the description of the specific control signal. CLK 52 is a clock input, which is a single source used for all I/O and internal clocking. Input RST_N 54 is an active-low asynchronous reset, which resets all control logic. Input DIR 56 is the transform mode select, where 0 denotes the FFT and 1 denotes the Inverse FFT (IFFT). Input SEL[3:0] 58 is the transform length select, with individual bits for each rank in the length superset. SYNC_IN 60 is the input sync strobe, which indicates to core 26 to begin processing input_data on the following clock cycle. A[31:0] 62 is the input data (per stream) with complex data of the form R+iQ, where R is contained in bits 31:16 and Q is contained in bits 15:0, each is a signed integer for the fixed-point example. SYNC_OUT 64 is the output sync strobe, which indicates core 26 is sending processed output_data on the following clock cycle. X[31:0] 66 is the output data (per stream) with complex data of the form R+iQ, where R is contained in bits 31:16 and Q is contained in bits 15:0, each is a signed integer for the fixed-point example.

Figure 5:
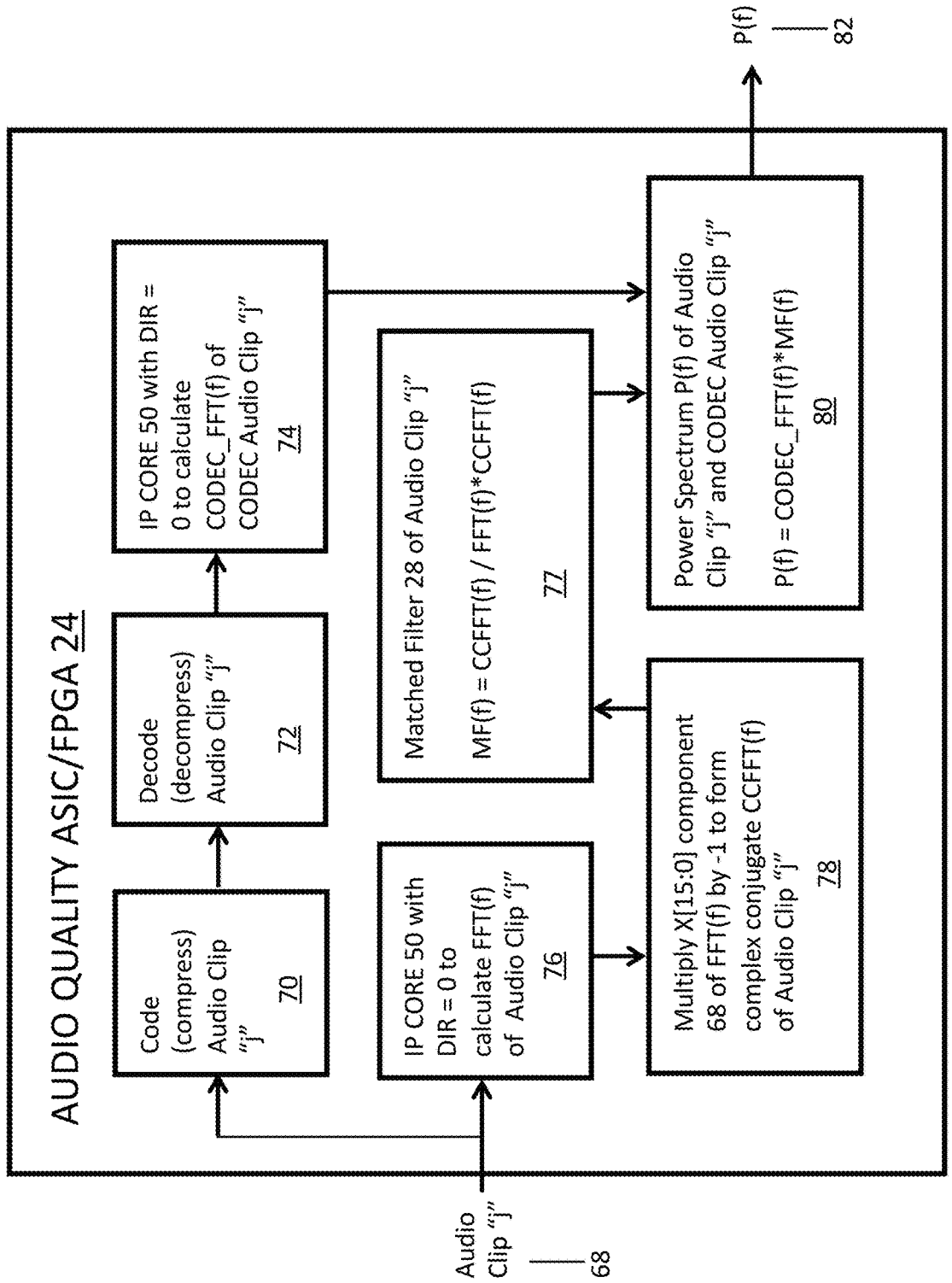
FIG. 5 illustrates an ASIC or FPGA of for calculating the FFT of the CODEC (compressed then decompressed) clip of an audio stream via one or more audio compression algorithms, calculating the matched filter of this audio clip, the calculating a cross-correlation between the CODEC audio clip and the uncompressed audio clip.

FIG. 5 shows circuitry embedded in an ASIC (Application Specific Integrated Circuit) or FPGA (Field Programmable Gate Array) 24. Audio clip "j" is coded (compressed) 68 then decoded (decompressed) 72. In 74, IP CORE 26 with DIR=0 is used to calculate CODEC_FFT(f) of the CODEC (coded/compressed then decoded/decompressed) audio clip "j." In 76, IP CORE 26 with DIR=0 is used to calculate the FFT(f) of the audio clip "j." In 78, multiply the output 76 of IP CORE 26 which is X[15:0] 66 by −1 to form the complex conjugate CCFFT(f) of audio clip "j." Then, in 77, calculate the matched filter 28 of audio clip "j" by the calculation MF(f) is CCFFT(f) pointwise divided by the pointwise product of FFT(f) and CCFFT(f). This calculation of the matched filter MF(f) is made very easy in the frequency domain, versus the complicated convolution integrals necessary in the time domain. Finally, in 80, calculate the power spectrum P(f) of Audio Clip "j" and CODEC Audio Clip "j" as P(f) 82 equals the pointwise product of CODEC_FFT(f) and MF(f). The rapid calculations done by the dedicated circuitry in ASIC (Application Specific Integrated Circuit) or FPGA (Field Programmable Gate Array) 24 could be done in the cloud or RAM memory, but would take much more time.

Figure 6A:
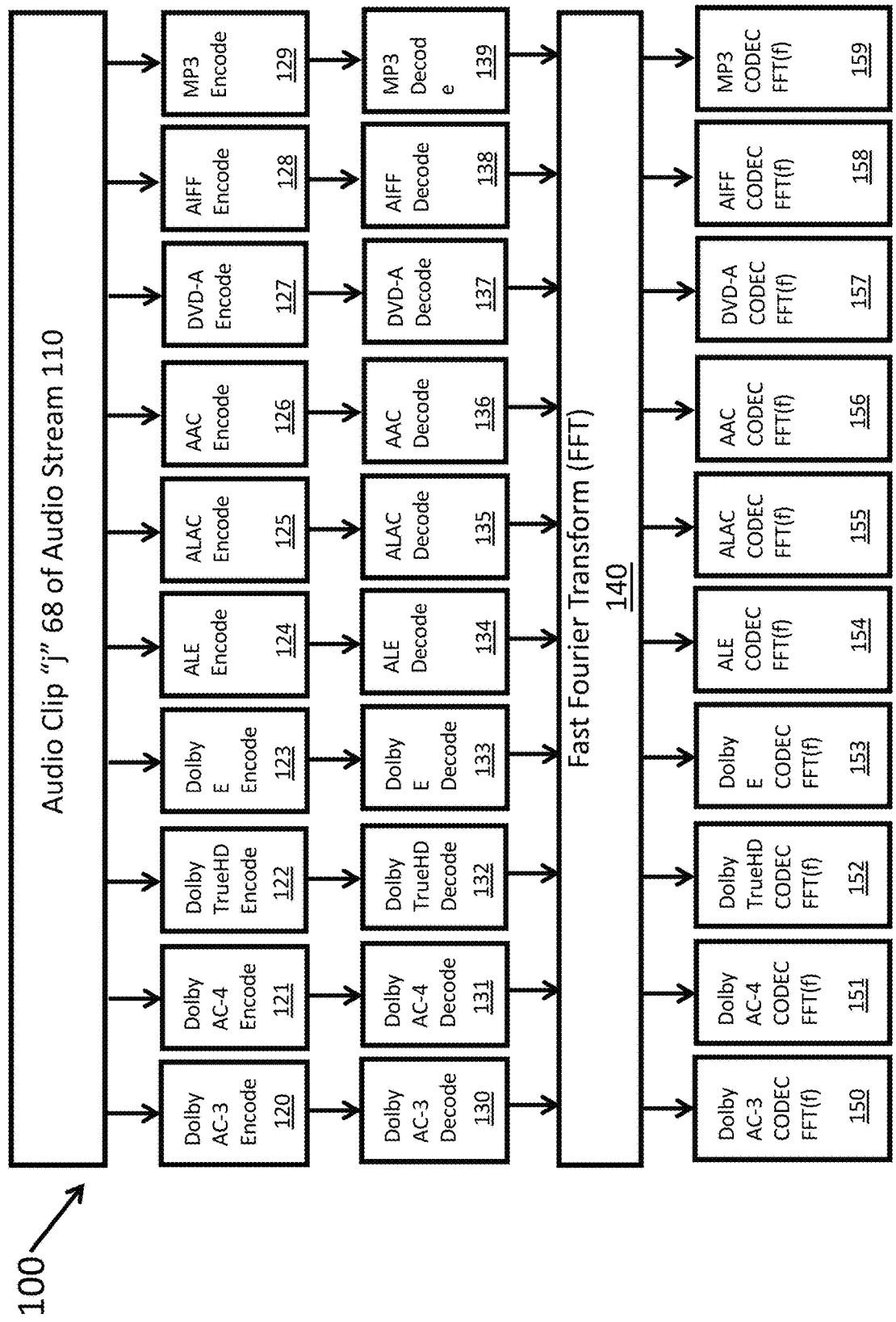
FIG. 6A illustrates a diagram of encoding (compressing) a clip of an audio stream via one or more audio compression algorithms, decoding (decompressing) the audio, then calculating the FFT of each decoded audio.

FIG. 6A shows block diagram 100 where audio clip "j" 68 of an audio stream 110 is individually encoded (compressed) by DOLBY® AC-3 encode 120, DOLBY® AC-4 encode 121, DOLBY® TrueHD encode 122, DOLBY® E encode 123, ALE (APPLE® Lossless Encoder) encode 124, ALAC (APPLE® Lossless Audio Codec) encode 125, AAC (Advanced Audio Encoding) encode 126, DVD-A (DVD-Audio) encode 127, AIFF (Audio Interchange File Format) encode 128, and MP3 encode 129. This list of encoding is not inclusive, as other audio encoders could be added. Next, the encoded (compressed) audio is decoded (decompressed) by DOLBY® AC-3 decode 130, DOLBY® AC-4 decode 131, DOLBY® TrueHD decode 132, DOLBY® E decode 133, ALE (APPLE® Lossless Encoder) decode 134, ALAC (APPLE® Lossless Audio Codec) decode 135, AAC (Advanced Audio Encoding) decode 136, DVD-A (DVD-Audio) decode 137, AIFF (Audio Interchange File Format) decode 138, and MP3 decode 139. This audio code-decode process is "lossy" and some loss of audio content is inevitable. The goal is to then select the best CODEC to use to store the audio clip 68 in an MXF wrapper. FIG. 5 continues with the use of Fast Fourier Transform 140, such as could be produced by FFT IP Core 26 of FIG. 3 with DIR 63 set to 0 as shown in FIG. 4, and individually using as input, such as A[31;0] 62, DOLBY® AC-3 decode 130, DOLBY® AC-4decode 131, DOLBY® TrueHD decode 132, DOLBY® E decode 133, ALE (APPLE® Lossless Encoder) decode 134, ALAC (APPLE® Lossless Audio Codec) decode 135, AAC (Advanced Audio Encoding) decode 136, DVD-A (DVD-Audio) decode 137, AIFF (Audio Interchange File Format) decode 138, and MP3 decode 139, to individually produce as output, such as output X[31;0] 66, the DOLBY® AC-3 CODEC_FFT(f) 150, DOLBY® AC-4 CODEC_FFT(f) 151, DOLBY® TrueHD CODEC_FFT(f) 152, DOLBY® E CODEC_FFT(f) 153, ALE (APPLE® Lossless Encoder) CODEC_FFT(f) 154, ALAC (APPLE® Lossless Audio Codec) CODEC_FFT(f) 155, AAC (Advanced Audio Encoding) CODEC_FFT(f) 156, DVD-A (DVD-Audio) CODEC_FFT(f) 157, AIFF (Audio Interchange File Format) CODEC_FFT(f) 158, and MP3 CODEC_FFT(f) 159. The symbol "f" denotes frequency.

Figure 6B:
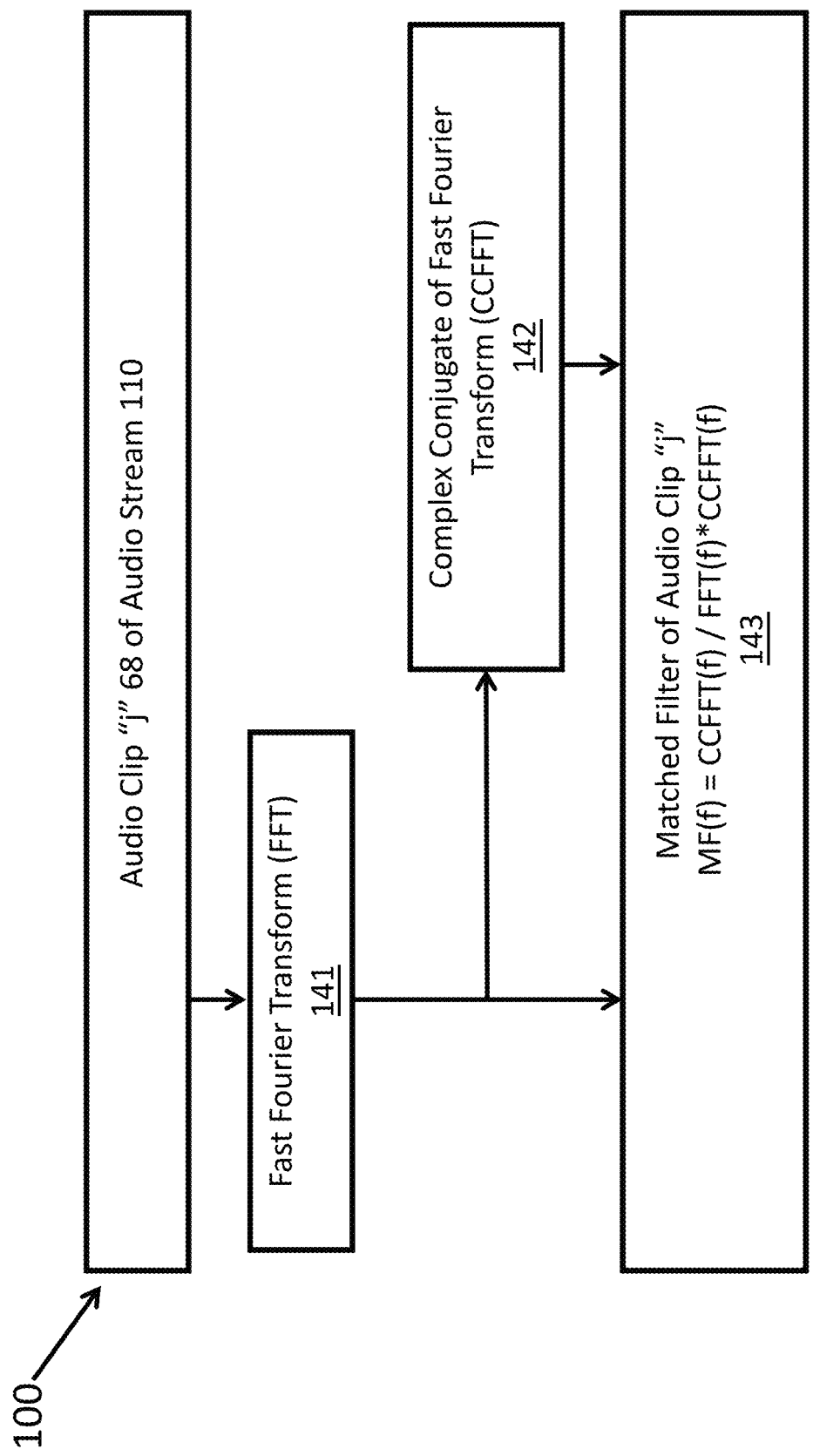
FIG. 6B illustrates a diagram of calculating the FFT of the audio clip and complex conjugate of this FFT of this same audio clip, then calculating the Matched Filter MF(f) for this audio clip.

FIG. 6B is a continuation of block diagram 100, Fast Fourier Transform of audio clip "j" 68 of audio stream 110 results in FFT(f) 141. CCFFT(f) 142, the complex conjugate of FFT(f), is calculated by multiplying output X[15:0] 66 of IP Core 26 by −1, which changes R+iQ to R−iQ, the complex conjugate. Then the Matched Filter of Audio Clip "j" 143 is calculated as MF(f)=CCFFT(f)/FFT(f)*CCFFT(f), which is the pointwise division of CCFFT(f) by the pointwise product of FFT(f) and CCFFT(f). The FFT of the time domain function g(t) is denoted by G(f) and the complex conjugate of the FFT G(f) is denoted by CCG(f). By the Weiner-Khinchin theorem, the FFT of the autocorrelation of a function g(t) in the time domain, FFT_AUTO-CORRELATION(g,g), is equivalent to G(f)*CCG(f), which is the pointwise product of the FFT of g(t) times the complex conjugate of the FFT of g(t). G(f)*GCC(f) is called the power spectrum of function g. Thus, by the Weiner-Khinchin theorem, the FFT of the autocorrelation of a function in the time domain is the power spectrum of that same function in the frequency domain. The Wiener-Khinchin theorem is also known as the Wiener-Khinchin theorem, the Wiener-Khinchin-Einstein theorem, or the Khinchin-Kolmogorov theorem. The simplicity of the arithmetic calculations in the frequency domain, namely G(f)*CCG(f), versus complicated convolution integrals in the time domain, is why the methodology of the frequency domain and FFT calculations leading to the power spectrum was chosen.

Figure 6C:
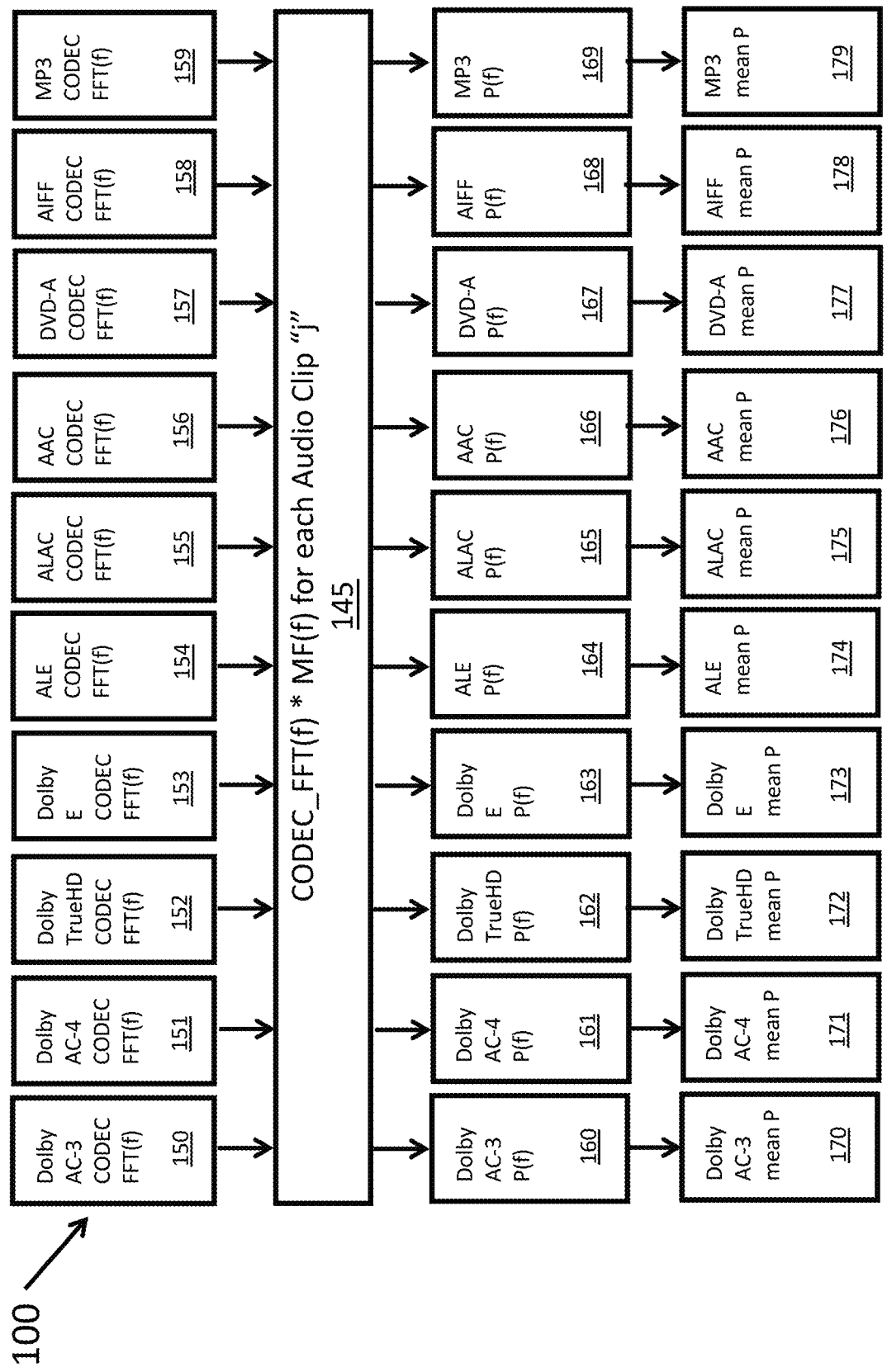
FIG. 6C illustrates a diagram of calculating the power spectrum P(f) between each CODEC audio clip and the uncompressed audio clip via the use of matched filter MF(f) of the uncompressed audio clip.

FIG. 6C is a continuation of block diagram 100. In this figure, the DOLBY® AC-3 CODEC_FFT(f) 150, DOLBY® AC-4 CODEC_FFT(f) 151, DOLBY® TrueHD CODEC_FFT(f) 152, DOLBY® E CODEC_FFT(f) 153, ALE (APPLE® Lossless Encoder) CODEC_FFT(f) 154, ALAC (APPLE® Lossless Audio Codec) CODEC_FFT(f) 155, AAC (Advanced Audio Encoding) CODEC_FFT(f) 156, DVD-A (DVD-Audio) CODEC_FFT(f) 157, AIFF (Audio Interchange File Format) CODEC_FFT(f) 158, and MP3 CODEC_FFT(f) 159 are each multiplied by the MF(f) 145 of Audio Clip "j". This produces a power spectrum P(f), for each CODEC format, namely DOLBY® AC-3 P(f) 160, Dolby AC-4 P(f) 161, DOLBY® TrueHD P(f) 162, DOLBY® E P(f) 163, ALE (APPLE® Lossless Encoder) P(f) 164, ALAC (APPLE® Lossless Audio Codec) P(f) 165, AAC (Advanced Audio Encoding) P(f) 166, DVD-A (DVD-Audio) P(f) 167, AIFF (Audio Interchange File Format) P(f) 168, and MP3 P(f) 169. From each power spectrum P(f), for each CODEC format, calculate a mean P which may be an arithmetic mean, geometric mean, or harmonic mean. Whichever mean is chosen, arithmetic mean, geometric mean, or harmonic mean, it is applied consistently across all CODEC formats DOLBY® AC-3 mean P 170, DOLBY® AC-4 mean P 171, DOLBY® TrueHD mean P 172, DOLBY® E mean P 173, ALE (APPLE® Lossless Encoder) mean P 174, ALAC (APPLE® Lossless Audio Codec) mean P 175, AAC (Advanced Audio Encoding) mean P 176, DVD-A (DVD-Audio) mean P 177, AIFF (Audio Interchange File Format) mean P 178, and MP3 mean P 179.

Figure 7A:
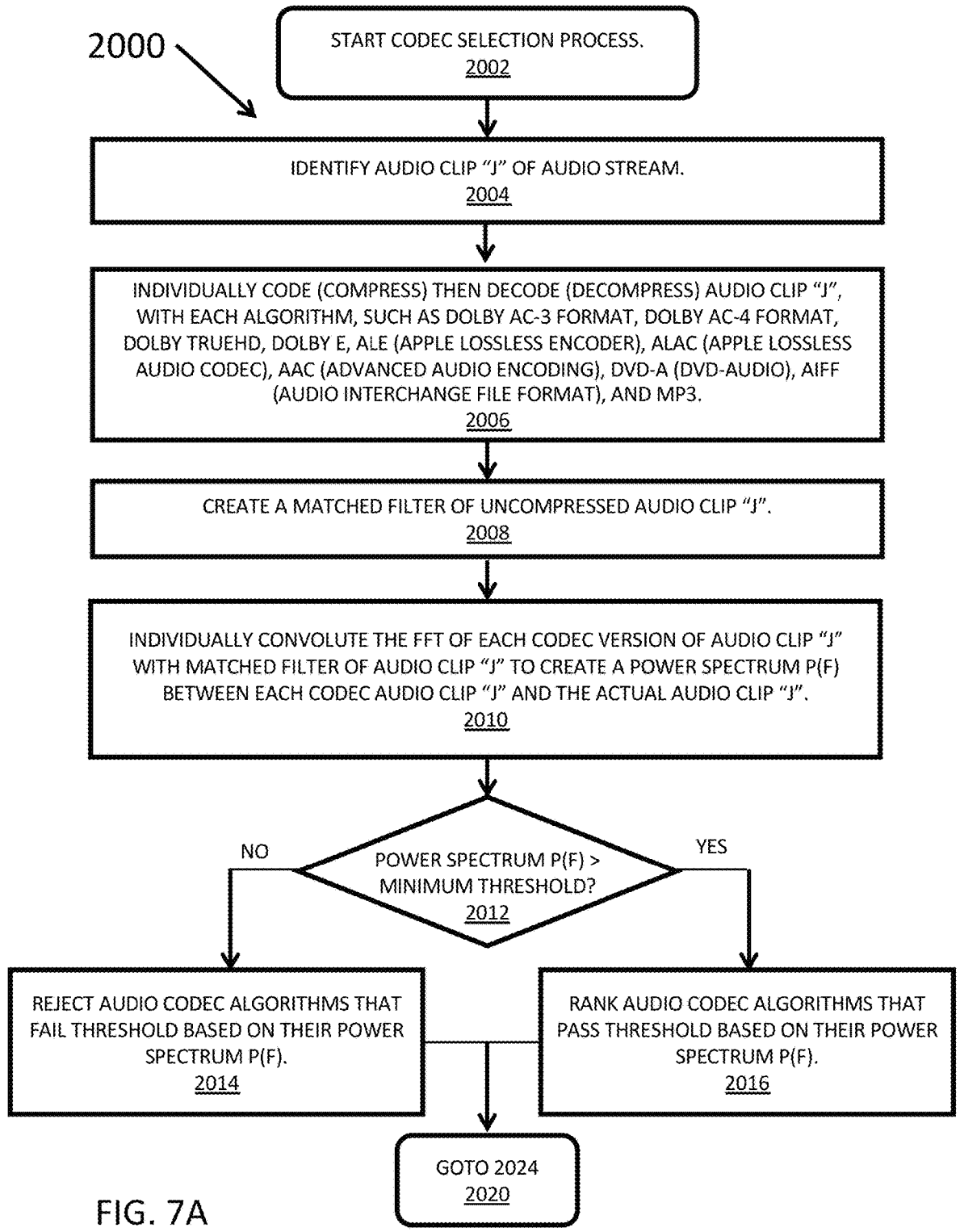
FIGS. 7A and 7B illustrate a flowchart depicting a process for determining an optimal audio codec algorithm based on a quality level determine from the power spectrum P(f) and the file size of the compressed audio file for inclusion with an MXF wrapper.
Figure 7B:
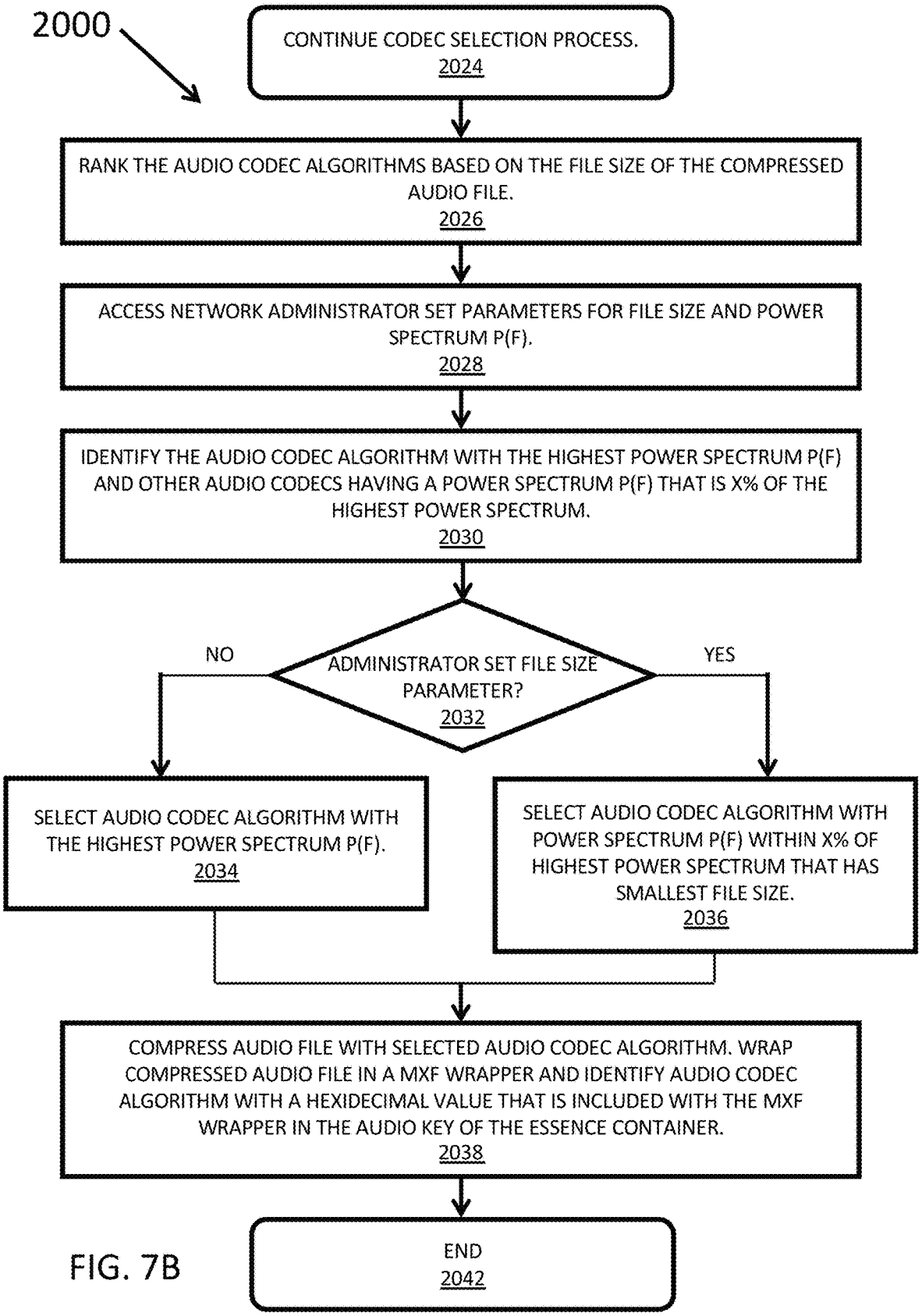
Figure 8:
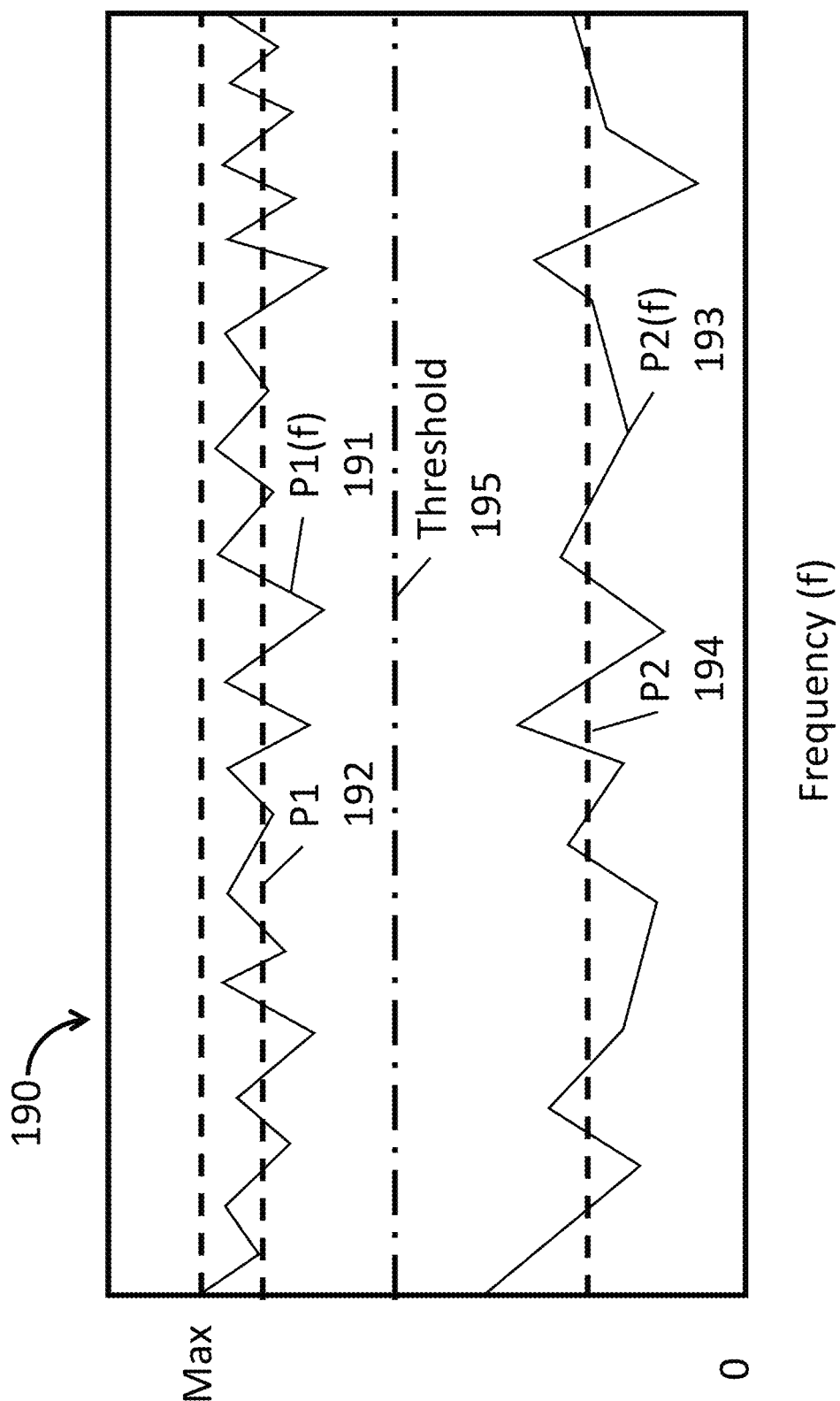
FIG. 8 illustrates power spectrums P(f), which is a function of frequency f, and mean values of P(f) denoted by P.

FIGS. 7A AND B illustrate a flowchart 2000 depicting a process for determining an optimal audio codec algorithm based on a quality level determine from the power spectrum P(f) and the file size of the compressed audio file for inclusion with an MXF wrapper. The process begins with START 2002. In step 2004, an audio clip "j" is identified from the audio stream. In step 2006, individually code (compress) then decode (decompress) in the DOLBY® AC-3 format, DOLBY® AC-4 format, DOLBY® TrueHD, DOLBY® E, ALE (APPLE® Lossless Encoder), ALAC (APPLE® Lossless Audio Codec), AAC (Advanced Audio Encoding), DVD-A (DVD-Audio), AIFF (Audio Interchange File Format), and MP3. In step 2008, create a matched filter of uncompressed audio clip "j." As described in FIG. 6B, this is done by taking the FFT of audio clip "j." Then the complex conjugate of FFT is created by multiplying the contents of X[15:0] 66 by −1. Then the matched filter MF(f) is equal to CCFFT (the complex conjugate of the FFT) pointwise divided by the pointwise product of FFT(f) and CCFFT(f). The product of FFT(f) and CCFFT(f) in the frequency domain is actually the FFT of the time-domain autocorrelation of audio clip "j." This division by the autocorrelation is done to normalized the P(f). However, in an alternate embodiment, MF(f)=CCFFT(f) and no normalization, no pointwise division by the pointwise product of FFT(f) and CCFFT(f), is done. In step 2010, individually convolute the FFT of each CODEC version of Audio Clip "j" with Matched Filter of Audio Clip "j" to create a power spectrum P(f) between each CODEC of audio clip "j" and the actual audio clip "j". To do this convolution by integrals in the time domain would be very complicated. However, by doing this calculation in the frequency domain, the power spectrum P(f) is simply the product of CODEC_FFT(f) and MF(f). In step 2012, system 10 determines whether the power spectrum P(f) is above a minimum threshold, thereby indicating whether the power spectrum P(f) of a particular audio codec meets a basic level of audio quality. If the power spectrum fails to meet that minimum level of quality by failing to meet that minimum threshold, then system 10 rejects the audio codec algorithms as possible options to compress audio file 22 in step 2014. If all audio codec algorithms fail to meet this minimum threshold, then system 10 will not compress audio file 22 with any audio codec and will instead wrap an uncompressed version of audio file 22 in the MXF file. For those audio codec algorithms that produce a power spectrum P(f) that exceeds the minimum threshold as determined in step 2012, then in step 2016, system 10 ranks the audio codec algorithms that pass the threshold based on their power spectrum for codec selector 30. In step 2020, the process proceeds to step 2024 shown in FIG. 7B where the process continues. In step 2026, system 10 uses codec selector 30 to rank the audio codec algorithms based on the file size of their respective compressed audio files. Then in step 2028, system 10 accesses the parameters and thresholds set by the network administrator regarding the file size and power spectrum P(f). In step 2030, system 10 identifiers the audio codec algorithm with the highest power spectrum P(f) and other audio codecs that have a power spectrum P(F) that is within X% of the highest power spectrum. The value of X% may be any value such as 15%, 10%, 5%, or any other number specified by the network administrator. By specifying a value for X%, the network administrator is defining a quality threshold for the audio spectrum level based off of the audio codec having the highest audio spectrum. In step 2032, system 10 determines if the administrator has set a parameter for the file size of the compressed audio file. If a parameter for the file size has not been selected, system 10 will evaluate the different audio codec algorithms based on audio quality as determined by which audio codec produces the highest power spectrum as set forth in step 2034. In step 2034, the process identifies the audio codec with the highest (most favorable) power spectrum "P." This is further discussed regarding FIG. 8, where "P" may be the arithmetic mean (average), geometric mean, or harmonic mean of Power Spectrum P(f). Specifically, from FIG. 8, P1 192 is greater than P2 193, indicating that P1(f) 192 is more favorable than P2(f) 194. In step 2036, a determination is made whether the highest power spectrum mean "P" is greater than a threshold. This threshold may be set in manufacturing, production, or by a user doing his or her own audio-visual work. In FIG. 8, P1 192 exceeds threshold 195 while P2 194 is beneath threshold 195. However, if an audio file size parameter has been specified, then system 10 will select the audio codec that produces a power spectrum within X% of the highest power spectrum and has the smallest file size as specified in step 2036. Then in step 2038, system 10 compresses the audio file 22 with the optimal audio codec selected by codec selected 30. After audio file 22 is compressed with the optical audio codec, system 10 uses MXF file wrapper module 32 to wrap the compressed audio file into an MXF wrapper. In this wrapping process, module 32 will encode a hexadecimal identifier designating which audio codec algorithm was used within the audio key of the essence container holding the particular compressed audio file within the MXF file. The process ends in step 2042.

FIG. 8 shows power spectrum P(f) 190 as a function of frequency f, which in one embodiment is the output 82 of ASIC/FPGA 24. P(f) will typically vary as a function of frequency, showing more favorable (higher) cross-correlations at some frequencies and less favorable (lower) cross-correlations at other frequencies. Two power spectrums are shown in FIG. 5, P(f) 191 and P2(f) 193. In order to compare P(f) against a user selectable threshold, each P(f) may be quantified as a number by taking the arithmetic mean "P" (average) value of that P(f) over the frequency range. In an alternative embodiment, the arithmetic mean is replaced by the geometric mean of each P(f) over the frequency range. In yet another alternative embodiment, the arithmetic mean is replaced by the harmonic mean of each P(f) over the frequency range. Two means are shown in FIG. 5; P1 192 is the mean of P1(f) 191, and P2 194 is the mean of P2(f). This quantification of each cross-correlation P(f) into mean "P," and threshold 195, are used in FIGS. 7A and 7B as a part of determining the optimal audio codec using its computed power spectrum.

Figure 9A:
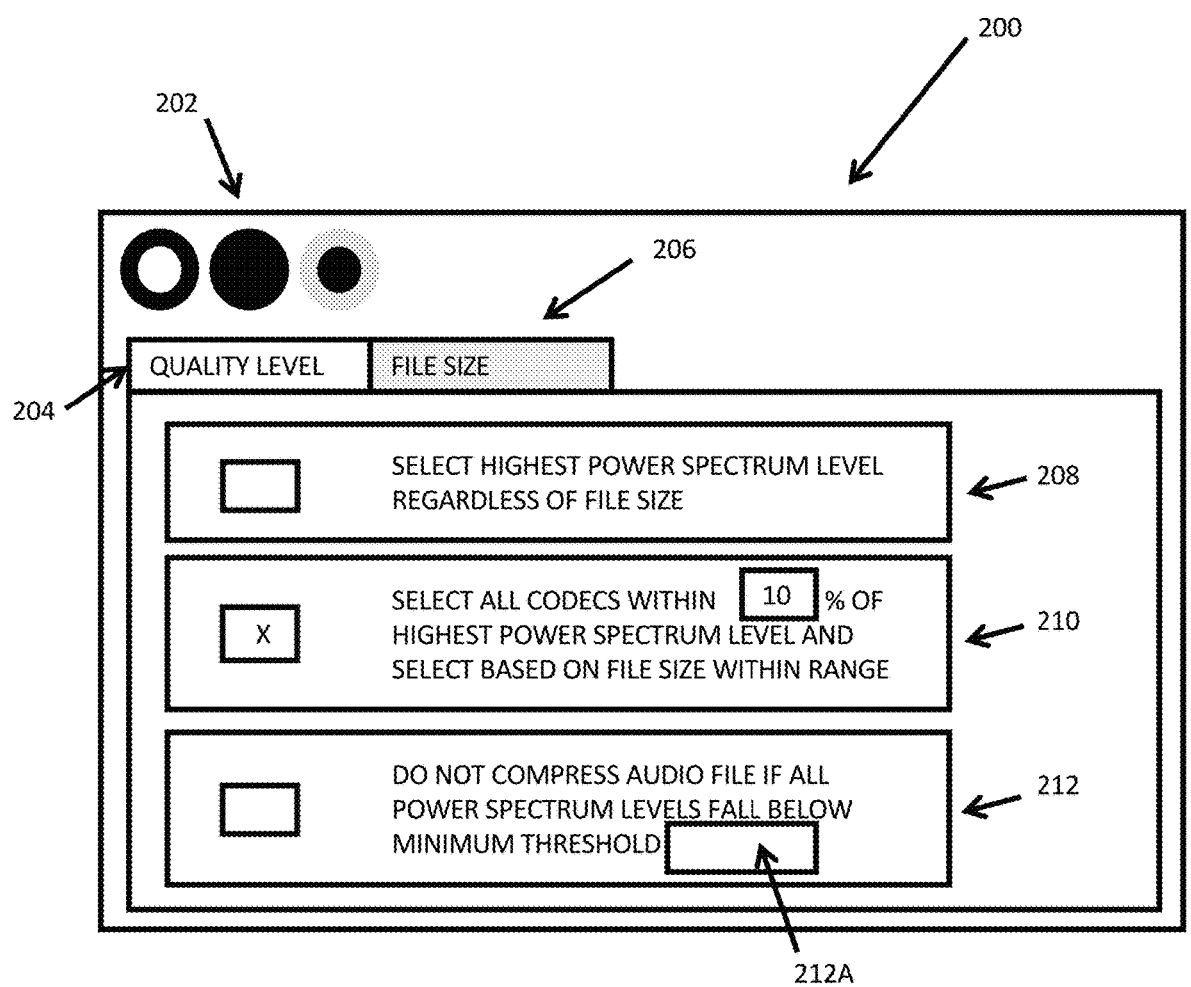
FIGS. 9A and 9B illustrate a GUI for a network administrator for specifying parameters for the selection of an optimal audio codec algorithm based on quality level and file size.
Figure 9B:
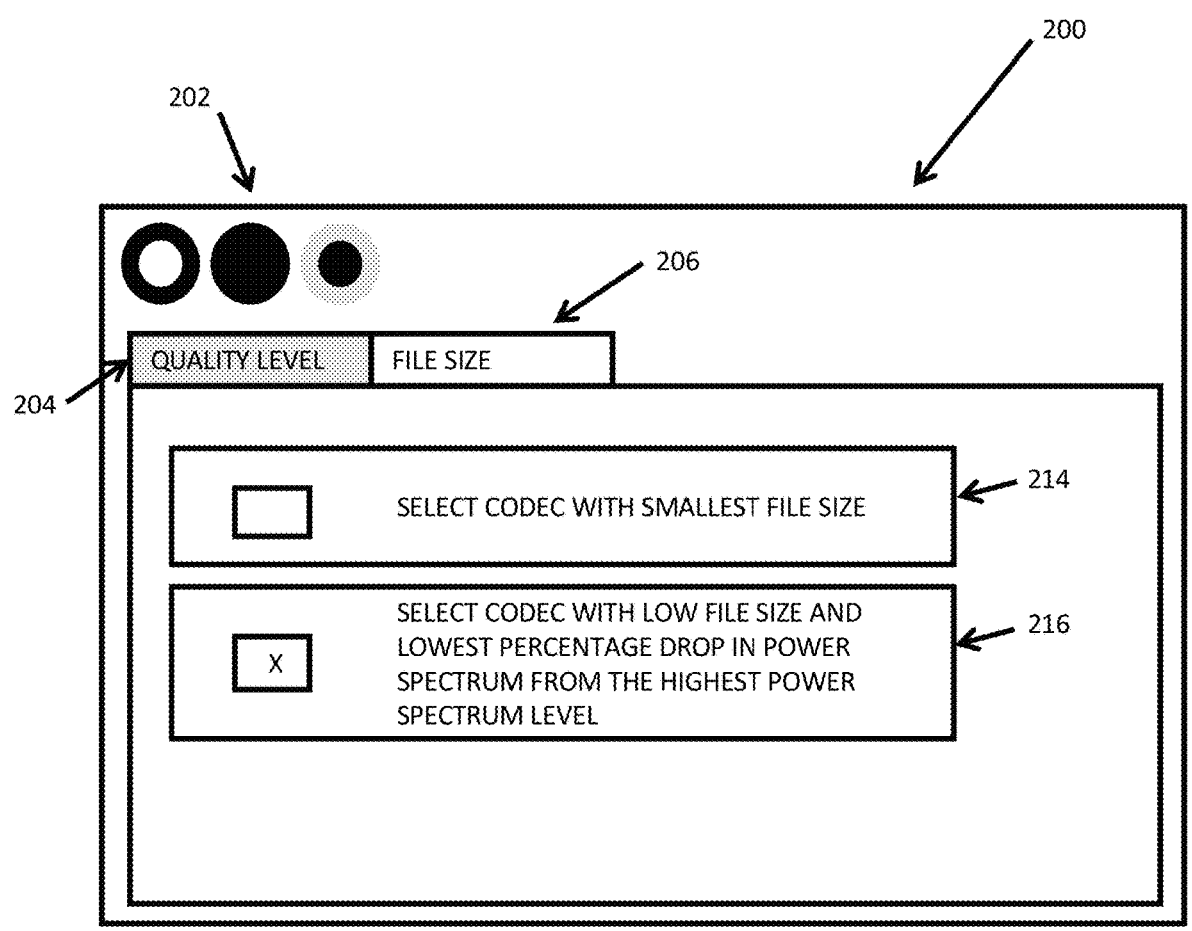

FIGS. 9A, and 9B illustrate a GUI 200 for a network administrator for specifying parameters for the selection of an optimal audio codec algorithm based on quality level and file size. GUI 200 includes graphical buttons 202 that allow a user to maximize, minimize, or close GUI window 200. The maximize graphical button 202 is a black circle with a white spot. The minimize graphical button 202 is a solid black circle. The close graphical button 202 is shown as a black dot surrounded by a grey circle. GUI 200 includes two menu selections 204 and 206. As shown in FIG. 9A, menu selection for 204 identifies GUI options for an administrator user to control the quality actions of the MXF audio quality system 10 with respect to selecting an audio codec algorithm. These actions include whether to select the codec algorithm with the highest power spectrum level regardless of the size of the compressed file by clicking on window selection 208. In window selection 210, the administrator user can select a range of codec algorithms within a certain percentage of the highest power spectrum level. In this example, window selection 210 is shown having 10% as the range within the highest spectrum level in which audio codecs must reach to be selected for consideration based on which audio codec algorithm produces the minimum the file size within the percentage range as specified. In window selection 212, the administrator user can specify that the system 10 not compress the audio file 22 if the power spectrum level falls below minimum threshold specified by the administrator user in the entry box 212A. As shown in FIG. 9B, the menu selections for file size in an administrator user option to select the audio codec algorithm with the smallest file size without regard to audio quality in option 214. In option 216, the administrator user may select the codec with a low file size that has the lowest percentage drop in power spectrum from the highest power spectrum level.

FIG. 10 shows the wrap of system item 302, picture item 310, sound item 320, and data item 330 to create the MXF wrapped picture, sound, and data 300. The picture item 310 includes key 312, length 314, and one or more frames or clips of pictures or video 316. Audio item 320 includes key 322, length 324, and audio 326. Audio 326 may be in the DOLBY® AC-3 format, DOLBY® AC-4 format, DOLBY® TrueHD, DOLBY® E, ALE (APPLE® Lossless Encoder), ALAC (APPLE® Lossless Audio Codec), AAC (Advanced Audio Encoding), DVD-A (DVD-Audio), AIFF (Audio Interchange File Format), MP3, and the like. Finally, data item 330 includes key 332, length 334, and data 336. For brevity, only one picture item, one sound item, and one data item is shown in FIG. 10, but more could be included. It should be noted that the MXF wrap 300 need not be inclusive of pictures/video 310, audio 320, and data 330. MXF wrap 300 may only contain audio 320 and data 330, or may contain only audio 320.

Figure 11:
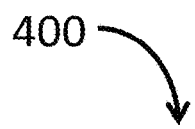
FIG. 11 illustrates the hexadecimal values within one byte of an MXF audio key representing either no compression or audio stored in an audio compression format such as DOLBY® AC-3 format, DOLBY® AC-4 format, DOLBY® TrueHD, DOLBY® E, ALE (APPLE® Lossless Encoder), ALAC (APPLE® Lossless Audio Codec), AAC (Advanced Audio Encoding), DVD-A (DVD-Audio), AIFF (Audio Interchange File Format), and MP3.

FIG. 11 shows table 400 describing the contents of one byte added to audio key 322. The hexadecimal value in column 410 is uniquely associated in column 420 with either no compression (0h), or DOLBY® AC-3 format (1h), DOLBY® AC-4 format (2h), DOLBY® TrueHD (3h), DOLBY® E (4h), ALE (APPLE® Lossless Encoder) (5h), ALAC (APPLE® Lossless Audio Codec) (6h), AAC (Advanced Audio Encoding) (7h), DVD-A (DVD-Audio) (8h), AIFF (Audio Interchange File Format) (9h), and MP3 (Ah). FIG. 10 is not limited to these audio CODEC formats, and more could be added, starting at hexadecimal B(h). Key 322 may each store a different hexadecimal number from column 410, depending on the best choice of algorithm in column 420 made by process 2000, FIGS. 7A and 7B.

Figure 12:
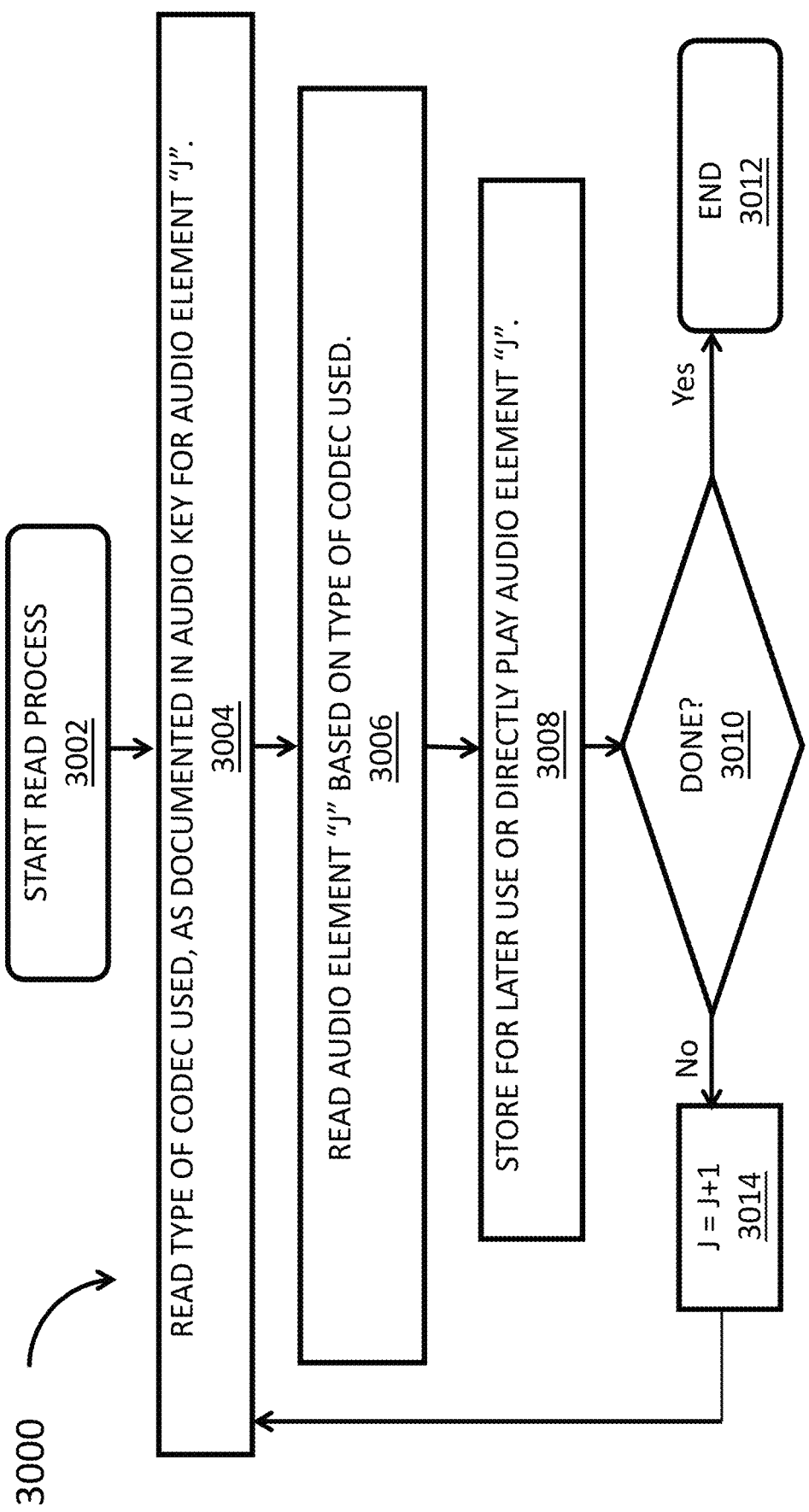
FIG. 12 illustrates a flowchart for reading an audio key to ascertain a value stored in a byte and thus knowing how to unwrap the audio stored in the MXF wrapper.

FIG. 12 is a flowchart of Read Process 3000. The read process starts at step 3002 and proceeds to step 3004 where the type of CODEC used as documented in key for Audio Element "j." This could be audio key 322 in FIG. 7 for audio element "j." Next, in step 3006 read audio element "j" based on the type of codec used. This could be audio element 326 in FIG. 7 for audio element "j." In step 3008, the decoded (decompressed) audio element "j" could be played directly or stored for later use. In step 3010, the determination is made whether the read process is concluded. If not, increment counter j by unity and cycle back to step 3004. If yes, the read process concludes in step 3012. The code or instructions to execute processes 1000, 2000, and 3000 may be stored on a Hard Disk Drive (HDD); a Solid-State Drive (SSD); Electrically-Erasable, Programmable, Read-Only Memory (EEPROM); Application Specific Integrated Circuit (ASIC); Field Programmable Gate Array (FPGA); Write-Once, Read Mostly Memory (WORM); Random Access Memory (RAM); Compact Disk (CD); Digital Versatile Disk (DVD); Blu-Ray disc (BD); magnetic tape; a cloud; and the like.

While the invention has been shown and described with reference to a particular embodiment thereof, it will be understood to those skilled in the art, that various changes in form and details may be made therein without departing from the spirit and scope of the invention. For example, the "hearing" terms of sound and audio are generally synonymous.

The invention claimed is:

1. A process for selecting an optimal audio codec, comprising:
creating a plurality of processed audio clips by compressing and then decompressing an original audio clip with a plurality of different audio codec algorithms;
creating a matched filter utilizing the original audio clip to determine a power spectrum of each of the processed audio clips; and
identifying a selected audio codec algorithm used to create a processed audio clip having a highest power spectrum utilizing the matched filter.

2. The process for selecting an optimal audio codec of claim 1, wherein the matched filter is based on a complex conjugate of a Fast Fourier Transform (FFT) of the original audio clip, wherein determining the power spectrum is based on a Fast Fourier Transform (FFT) of each of the processed audio clips .

3. The process for selecting an optimal audio codec of claim 2, wherein the plurality of different audio codec algorithms are selected from a group consisting of DOLBY® AC-3 format, DOLBY® AC-4 format, DOLBY® TrueHD, DOLBY® E, ALE (APPLE® Lossless Encoder), ALAC (APPLE® Lossless Audio Codec), AAC (Advanced Audio Encoding), DVD-A (DVD-Audio), AIFF (Audio Interchange File Format), MP3, WMA, RA, Ogg Vorbis, and FLAC, further comprising compressing the original audio clip with the selected audio codec algorithm and wrapping it within a metadata file.

4. The process for selecting an optimal audio codec of claim 3, wherein the power spectrum of each of the processed audio clips is formed by multiplying a Fast Fourier Transform (FFT) of a particular audio clip with the matched filter, wherein the metadata file is a Material eXchange Format (MXF) file.

5. The process for selecting an optimal audio codec of claim 2, wherein the match filter is not normalized, or it is normalized, wherein the match filter that is not normalized is given by the equation $MF(f)=CCFFT(f)$ and the match filter that is normalized is given by the equation $MF(f)=CCFFT(f)/FFT(f)*CCFFT(f)$, wherein f is frequency, wherein the power spectrum $P(f)$ is the product of CODEC $FFT(f)$ and $MF(f)$ where the CODEC $FFT(f)$ is the Fast Fourier Transform (FFT) of the original audio clip after it has been compressed and decompressed by one of the audio codec algorithms.

6. The process for selecting an optimal audio codec for compressing of claim 5, wherein the original audio clip is not compressed with any audio codec algorithm when the selected audio codec algorithm with the highest power spectrum fails to meet a minimum power spectrum threshold.

7. A process for selecting an optimal audio codec for compressing an audio file for wrapping in a metadata file, comprising:
creating a plurality of processed audio clips by compressing and then decompressing an original audio clip with a plurality of different audio codec algorithms;
determining a quality level of the different audio codec algorithms by taking a power spectrum of each processed audio clip using a matched filter based on the original audio clip and a Fast Fourier Transform (FFT) of each processed audio clip;
determining a file size for each processed audio clip when it is compressed by its respective audio codec algorithm;
selecting an optimal audio codec algorithm for the original audio clip based on the determined quality level and the file size; and
compressing the original audio clip with the optimal audio codec algorithm and wrapping it within a metadata file.

8. The process for selecting an optimal audio codec for compressing an audio file for wrapping in a metadata file of claim 7, wherein the optimal audio codec algorithm is determined by identifying a first audio codec algorithm used to create a processed audio clip having a highest power spectrum utilizing the matched filter, thereby signifying the highest audio quality.

9. The process for selecting an optimal audio codec for compressing an audio file for wrapping in a metadata file of claim 8, wherein the optimal audio codec algorithm is further determined by identifying one or more other audio codec algorithms used to create processed audio clips having a power spectrum within a designated percentage range of the highest power spectrum level, and selecting the audio codec algorithm that has the smallest file size.

10. The process for selecting an optimal audio codec for compressing an audio file for wrapping in a metadata file of claim 9, wherein the plurality of different audio codec algorithms are selected from a group consisting of DOLBY® AC-3 format, DOLBY® AC-4 format, DOLBY® TrueHD, DOLBY® E, ALE (APPLE® Lossless Encoder), ALAC (APPLE® Lossless Audio Codec), AAC (Advanced Audio Encoding), DVD-A (DVD-Audio), AIFF (Audio Interchange File Format), MP3, WMA, RA, Ogg Vorbis, and FLAC, wherein the metadata file is a Material eXchange Format (MXF) file.

11. The process for selecting an optimal audio codec for compressing an audio file for wrapping in a metadata file of claim 10, wherein the power spectrum of each of the processed audio clips is formed by multiplying the Fast Fourier Transform (FFT) of a particular audio clip with the matched filter.

12. The process for selecting an optimal audio codec for compressing an audio file for wrapping in a metadata file of claim 9, wherein the designated percentage range is less than 15 percent.

13. The process for selecting an optimal audio codec for compressing an audio file for wrapping in a metadata file of claim 12, wherein the matched filter is based on a complex conjugate of the Fast Fourier Transform (FFT) of the original audio clip.

14. The process for selecting an optimal audio codec for compressing an audio file for wrapping in a metadata file of claim 10, wherein the Material eXchange Format (MXF) file includes a metadata identifier signifying which audio codec algorithm was used to compress the original audio file.

15. The process for selecting an optimal audio codec for compressing an audio file for wrapping in a metadata file of claim 13, wherein the match filter is not normalized, or the match filter is normalized.

16. The process for selecting an optimal audio codec for compressing an audio file for wrapping in a metadata file of claim 15, wherein the match filter that is not normalized is given by the equation $MF(f)=CCFFT(f)$ and the match filter that is normalized is given by the equation $MF(f)=CCFFT(f)/FFT(f)*CCFFT(f)$, wherein f is frequency, wherein the power spectrum $P(f)$ is the product of $CODEC\ FFT(f)$ and $MF(f)$ where the $CODEC\ FFT(f)$ is the Fast Fourier Transform (FFT) of the original audio clip after it has been compressed and decompressed by one of the audio codec algorithms.

17. A system for selecting an optimal audio codec for compressing an audio file for wrapping within a metadata file, comprising:

a storage device storing an original audio clip;

an audio quality processor that accesses the original audio clip and generates a plurality of power spectrum values by compressing and decompressing the original audio clip using a plurality of audio codec algorithms with subsequent processing by a Fast Fourier Transform (FFT) IP Core along with a matched filter created from the original audio clip;

an audio codec algorithm selector that choses an optimal audio codec algorithm based on which one produces a power spectrum with a highest value; and a metadata file wrapping module that wraps the original audio clip within a metadata file after it has been compressed by the optimal audio codec algorithm.

18. The system for selecting an optimal audio codec for compressing an audio file for wrapping within a metadata file of claim 17, wherein the plurality of audio codec algorithms is selected from a group consisting of DOLBY® AC-3 format, DOLBY® AC-4 format, DOLBY® TrueHD, DOLBY® E, ALE (APPLE® Lossless Encoder), ALAC (APPLE® Lossless Audio Codec), AAC (Advanced Audio Encoding), DVD-A (DVD-Audio), AIFF (Audio Interchange File Format), MP3, WMA, RA, Ogg Vorbis, and FLAC, wherein the metadata file is a Material eXchange Format (MXF) file.

19. The file generation system for selecting an optimal audio codec for compressing an audio file for wrapping within a metadata file of claim 18, wherein the audio codec algorithm selector choses the optimal audio codec algorithm based on selecting the audio codec algorithm that creates a smallest file size with the power spectrum above a specified threshold.

20. The system for selecting an optimal audio codec for compressing an audio file for wrapping within a metadata file of claim 17, wherein the metadata file includes a metadata identifier signifying which audio codec algorithm was used to compress the original audio file, wherein the matched filter is based on a complex conjugate of the Fast Fourier Transform (FFT) of the original audio clip, wherein the match filter is not normalized, or the match filter is normalized, wherein the match filter that is not normalized is given by the equation $MF(f)=CCFFT(f)$ and the match filter that is normalized is given by the equation $MF(f)=CCFFT(f)/FFT(f)*CCFFT(f))$, wherein f is frequency, wherein the power spectrum $P(f)$ is the product of $CODEC\ FFT(f)$ and $MF(f)$ where the $CODEC\ FFT(f)$ is the Fast Fourier Transform (FFT) of the original audio clip after it has been compressed and decompressed by one of the audio codec algorithms.

* * * * *